US012680341B2

(12) United States Patent
Wu

(10) Patent No.: US 12,680,341 B2
(45) Date of Patent: Jul. 14, 2026

(54) DOOR LOCK OPERATING DEVICE WITH AN ALERT FUNCTION

(71) Applicant: I-TEK METAL MFG. CO., LTD, Tainan (TW)

(72) Inventor: Chang-Ren Wu, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 164 days.

(21) Appl. No.: 18/733,677

(22) Filed: Jun. 4, 2024

(65) Prior Publication Data

US 2025/0369255 A1 Dec. 4, 2025

(51) Int. Cl.

*E05B 41/00* (2006.01)
*E05B 17/10* (2006.01)
*E05B 63/00* (2006.01)

(52) U.S. Cl.

CPC .............. *E05B 41/00* (2013.01); *E05B 17/10* (2013.01); *E05B 63/0017* (2013.01)

(58) Field of Classification Search

CPC ................................ E05B 41/00; E05B 17/10
See application file for complete search history.

(56) References Cited

U.S. PATENT DOCUMENTS 289,196 A * 11/1883 Welsh .................... E05B 41/00 40/907
481,960 A * 9/1892 Lindstrom .............. E05B 41/00 40/907
689,429 A * 12/1901 Smith ..................... E05B 41/00 40/907
943,637 A * 12/1909 Schell ..................... E05B 41/00 40/907
1,099,106 A * 6/1914 Wevat ..................... E05B 41/00 40/907
1,643,932 A 9/1927 Teich
1,687,009 A 10/1928 Drexler et al.
2,455,208 A * 11/1948 Wirth ...................... E05B 41/00 40/907
2,565,669 A * 8/1951 Smith ..................... E05B 41/00 40/907
2,820,241 A 1/1958 Schlage
3,126,218 A * 3/1964 Andrews ................. E05B 41/00 292/147
4,102,005 A 7/1978 Schnarr et al.
(Continued)

FOREIGN PATENT DOCUMENTS

AU 2014339759 B2 5/2018
CH 379945 A * 7/1964 ............ E05B 41/00
(Continued)

*Primary Examiner* — Carlos Lugo
(74) *Attorney, Agent, or Firm* — Che-Yang Chen; Law Office of Michael Chen

(57) ABSTRACT

A door lock operating device with an alert function comprises an operating portion and an indicating portion. A lighting unit is disposed in the indicating portion and is electrically connected to the operating portion. The operating portion includes an outer connecting member interlocked with an anti-theft latch of a door lock and operable to move the anti-theft latch between an anti-theft position and a non-anti-theft position. When the anti-theft latch is in the anti-theft position, the outer connecting member permits control of the lighting unit to or not to emit light.

12 Claims, 12 Drawing Sheets

(56) References Cited

U.S. PATENT DOCUMENTS 4,107,877 A 8/1978 Lee
4,267,619 A 5/1981 Suska
4,348,835 A 9/1982 Jones et al.
4,419,787 A 12/1983 Lieberman
4,501,090 A 2/1985 Yoshida et al.
4,628,636 A 12/1986 Folger
4,867,496 A 9/1989 Thomas
5,040,331 A 8/1991 Merendino et al.
5,782,509 A 7/1998 Uyeda
6,177,771 B1 1/2001 Kinzer et al.
6,454,324 B1 9/2002 Lewis et al.
6,553,717 B2 4/2003 St. John et al.
6,622,535 B2 9/2003 Chiang et al.
6,634,140 B1 10/2003 Sellman
6,732,557 B1 5/2004 Zehrung
6,745,603 B1 6/2004 Shaw
6,786,006 B2 9/2004 Kowalczyk et al.
6,891,479 B1 5/2005 Eccleston
6,932,486 B1 * 8/2005 Eller ....................... E05B 17/10 362/100
6,938,445 B2 * 9/2005 Huang .................... E05B 41/00 70/432
6,978,646 B2 12/2005 Raatikainen
7,051,403 B2 5/2006 Homberg
7,061,197 B1 6/2006 Mullet et al.
7,068,179 B2 6/2006 Snell et al.
7,143,547 B2 12/2006 Liles, Jr.
7,234,201 B2 6/2007 Brown et al.
7,240,524 B1 7/2007 White et al.
7,282,883 B2 10/2007 Mullet et al.
7,296,380 B2 11/2007 Backman
7,316,096 B2 1/2008 Houser et al.
7,418,800 B1 9/2008 Sellman
7,484,333 B2 2/2009 Houser et al.
7,555,867 B2 7/2009 Liles, Jr.
7,717,155 B2 5/2010 Mullet
7,774,984 B2 8/2010 Hsu
7,966,771 B2 6/2011 Bienek
8,109,038 B2 2/2012 Houser et al.
8,169,169 B2 5/2012 Hass et al.
8,201,858 B1 6/2012 Moon et al.
8,225,458 B1 7/2012 Hoffberg
8,248,005 B2 8/2012 Romer
8,359,790 B2 1/2013 Shin
8,382,008 B1 2/2013 Ricciardi et al.
8,390,219 B2 3/2013 Houser
8,393,054 B2 3/2013 Bienek
8,407,937 B2 4/2013 Houser
8,415,902 B2 4/2013 Burris et al.
8,434,268 B2 5/2013 Nixon
8,499,495 B2 8/2013 Houser et al.
8,523,248 B2 9/2013 Tien
8,540,290 B2 9/2013 Chen
8,547,046 B2 10/2013 Burris et al.
8,601,744 B2 12/2013 Wildforster et al.
8,695,277 B2 4/2014 Romer et al.
8,773,237 B2 7/2014 Burris et al.
8,826,598 B2 9/2014 Ranaudo et al.
8,875,344 B2 11/2014 Salutzki et al.
8,904,710 B2 12/2014 Romer et al.
8,963,683 B2 2/2015 Romer
9,003,630 B2 4/2015 Hufen
9,045,927 B1 6/2015 Hoffberg
9,097,051 B2 8/2015 Hellwig
9,115,526 B2 8/2015 Houser et al.
9,121,217 B1 9/2015 Hoffberg
9,163,446 B2 10/2015 Houser et al.
9,181,744 B2 11/2015 Salutzki et al.
9,187,942 B2 11/2015 Wildforster
9,297,194 B2 3/2016 Bienek et al.
9,506,284 B2 11/2016 Braverman et al.
9,514,583 B2 12/2016 Zasowski et al.
9,631,412 B2 4/2017 Hellwig et al.
9,683,378 B2 6/2017 Houser et al.
9,695,620 B2 7/2017 Zasowski et al.
9,830,932 B1 11/2017 Gunderson et al.
9,869,117 B2 1/2018 Houser et al.
9,886,831 B1 2/2018 Svoboda et al.
9,995,076 B1 6/2018 Hoffberg
10,006,236 B2 6/2018 Hellwig et al.
10,024,094 B2 7/2018 Bell et al.
10,030,425 B2 7/2018 Zasowski et al.
10,030,426 B2 7/2018 Langenberg
10,077,591 B2 9/2018 Hass
10,180,023 B2 1/2019 Zasowski et al.
10,208,520 B2 2/2019 Long et al.
10,236,801 B2 3/2019 Dye et al.
10,253,540 B2 4/2019 Bell et al.
10,273,736 B2 4/2019 Hucker
10,280,670 B2 5/2019 Roberts
10,280,678 B1 5/2019 Rendon, Jr. et al.
10,304,272 B2 5/2019 Kvinge et al.
10,316,568 B2 6/2019 Langenberg et al.
10,344,502 B2 7/2019 McKibben et al.
10,415,301 B2 9/2019 Kuan
10,458,151 B1 10/2019 Shen
10,472,873 B2 11/2019 Ladha et al.
10,480,238 B1 11/2019 La Force
10,559,151 B2 2/2020 Kvinge et al.
10,648,198 B1 5/2020 Shen
10,648,208 B2 5/2020 Eickhoff
10,704,310 B1 7/2020 Barbon et al.
10,704,313 B2 7/2020 Houser et al.
10,724,288 B2 7/2020 Baumgarte
10,844,644 B2 11/2020 Langenberg et al.
10,968,677 B2 4/2021 Hass
11,002,055 B2 5/2021 Eickhoff et al.
11,124,997 B2 9/2021 Eickhoff
11,187,022 B1 11/2021 Hoffberg
11,250,655 B2 2/2022 Shen
11,312,207 B1 4/2022 Sanders et al.
11,417,200 B2 8/2022 Hass et al.
11,542,727 B2 1/2023 Hsu
11,544,979 B1 1/2023 Shen
11,606,681 B2 3/2023 Shen
11,624,208 B2 * 4/2023 Shumaker ............. E05B 13/108 70/432
11,629,527 B2 4/2023 Hsu
11,629,544 B1 4/2023 Tien
11,631,292 B2 4/2023 Shen
11,661,782 B2 5/2023 Eickhoff et al.
11,727,770 B2 8/2023 Shen et al.
11,753,848 B2 9/2023 Tien
11,756,355 B2 9/2023 Shen
11,795,751 B2 10/2023 Tien
11,798,330 B2 10/2023 Shen
11,814,876 B2 11/2023 Huang
11,828,097 B1 11/2023 Tien
2002/0026750 A1 3/2002 St. John et al.
2002/0178655 A1 12/2002 Pedemonte
2003/0127869 A1 7/2003 Herron et al.
2003/0187805 A1 10/2003 Shen
2003/0204935 A1 11/2003 Kim
2005/0154612 A1 7/2005 Smith et al.
2006/0244271 A1 11/2006 Hass
2006/0261675 A1 11/2006 Unno
2007/0022664 A1 2/2007 Mahonen et al.
2007/0114800 A1 5/2007 Kuo
2007/0256362 A1 11/2007 Hansen
2007/0268132 A1 11/2007 Milo
2008/0011030 A1 1/2008 Ferreira Sanchez et al.
2009/0265992 A1 10/2009 Hass et al.
2010/0107495 A1 5/2010 Bourgeois et al.
2010/0315229 A1 12/2010 Shin
2011/0094160 A1 4/2011 Houser
2011/0252597 A1 10/2011 Burris et al.
2011/0302841 A1 12/2011 Ye et al.
2012/0029701 A1 2/2012 Houser
2012/0159852 A1 6/2012 Houser et al.
2012/0190325 A1 7/2012 Abu-Hakima et al.
2013/0009785 A1 1/2013 Finn et al.
2013/0216438 A1 8/2013 Hill et al.
2013/0308778 A1 11/2013 Fosmark et al.
2013/0346333 A1 12/2013 Hassler et al.

(56) References Cited

U.S. PATENT DOCUMENTS

2014/0026627 A1 1/2014 Rai et al.
2014/0165329 A1 6/2014 Wildförster
2014/0255252 A1 9/2014 Stratman et al.
2014/0282934 A1 9/2014 Miasnik et al.
2014/0325911 A1 11/2014 Hass
2015/0070166 A1 3/2015 Boyden et al.
2015/0113876 A1 4/2015 Burris et al.
2015/0194033 A1 7/2015 Esposito et al.
2015/0211278 A1 7/2015 Moyer et al.
2015/0262438 A1 9/2015 Zasowski et al.
2015/0339913 A1 11/2015 Lyman et al.
2016/0220716 A1 8/2016 Childress et al.
2016/0258189 A1 9/2016 Frolov
2016/0312514 A1 10/2016 Leonard et al.
2016/0348415 A1 12/2016 Baumgarte
2016/0368455 A1 12/2016 Kim et al.
2017/0275912 A1 9/2017 Murphy
2017/0275921 A1 9/2017 Murphy et al.
2017/0306668 A1 10/2017 Li et al.
2017/0328100 A1 11/2017 Eickhoff
2018/0155959 A1* 6/2018 Hartung .................. E05B 17/10
2018/0223577 A1 8/2018 Hucker
2018/0334841 A1 11/2018 Langenberg et al.
2018/0334845 A1 11/2018 Hass
2019/0043289 A1 2/2019 Cahill
2019/0043296 A1 2/2019 Baumgarte et al.
2019/0145138 A1 5/2019 Eickhoff
2019/0153764 A1 5/2019 Baumgarte
2019/0203503 A1 7/2019 Chang
2019/0264486 A1 8/2019 Toloday et al.
2019/0319557 A1 10/2019 Dye et al.
2019/0338576 A1 11/2019 Wang
2019/0345738 A1 11/2019 Mckibben et al.
2019/0376316 A1 12/2019 Hsu
2019/0376317 A1 12/2019 Hsu
2019/0383080 A1 12/2019 Barbon et al.
2020/0037142 A1 1/2020 Lofton
2020/0190885 A1 6/2020 Coleman
2020/0211362 A1 7/2020 Shen
2020/0256108 A1 8/2020 Shetty et al.
2020/0327758 A1 10/2020 Ma et al.
2020/0372743 A1 11/2020 Miller et al.
2021/0011443 A1 1/2021 Mcnamara et al.
2021/0012598 A1 1/2021 Giebat et al.
2021/0023248 A1 1/2021 Townsend et al.
2021/0056791 A1 2/2021 Shen
2021/0123287 A1 4/2021 Miller et al.
2021/0134096 A1 5/2021 Pukari
2021/0192876 A1 6/2021 Tikkanen et al.
2021/0217260 A1 7/2021 Chen
2021/0252179 A1 8/2021 Grinstead et al.
2021/0308311 A1 10/2021 Stewart et al.
2022/0148393 A1 5/2022 Shen et al.
2022/0307316 A1 9/2022 Soderqvist
2023/0104006 A1 4/2023 Tien
2023/0133080 A1 5/2023 Tien
2023/0374820 A1 11/2023 Huang

FOREIGN PATENT DOCUMENTS

DE 102016202225 A1 8/2017
DE 102017209467 A1 12/2018
EP 0107151 A1 5/1984
EP 1788169 A1 5/2007
EP 2933415 A1 10/2015
EP 3550528 A1 9/2019
EP 3805490 A1 4/2021
FR 500300 A * 3/1920
GB 2322902 A * 9/1998 ............. E05B 63/16
GB 2572027 A 9/2019
KR 20210019168 A 2/2021
KR 20210033154 A 3/2021
WO 8800633 A1 1/1988
WO 2021007588 A1 1/2021
WO 2021050616 A1 3/2021
WO 2021214134 A1 10/2021
WO 2022063950 A1 3/2022
WO 2022063952 A1 3/2022
WO 2023036744 A1 3/2023
WO WO-2025194165 A1 * 9/2025 ........... E05B 47/026

* cited by examiner

DOOR LOCK OPERATING DEVICE WITH AN ALERT FUNCTION

BACKGROUND OF THE INVENTION

The present invention relates to a door lock operating device with an alert function and, more particularly, to a door lock operating device operable to lock and unlock a door.

A door lock is generally mounted on a door to provide a locking effect when the door is in a closed position. The door lock is operable through inner and outer operating devices respectively installed on the inner and outer sides of door and includes an anti-theft latch. The inner operating device includes a knob interlocked with the anti-theft latch. The knob can be pivoted to move the anti-theft latch to an extended, anti-theft position. When the anti-theft latch is in the anti-theft position, the door lock and the outer operating device interlocked with the door lock are locked, such that the door lock cannot be unlocked by operating the outer operating device.

Although the knob of the inner operating device can be directly operated to move the anti-theft latch to the anti-theft position or a non-anti-theft position, the inner operating device cannot indicate whether the anti-theft latch is in the anti-theft position or the non-anti-theft position. Therefore, when in an emergent condition, a person at the indoor side may panic and, thus, cannot identify the position of the anti-theft latch from appearance. Therefore, a panicked person may erroneously move the anti-theft latch from the anti-theft position to the non-anti-theft position, such that another person on the outdoor side can easily unlock the door lock by operating the outer operating device, thereby opening the door.

BRIEF SUMMARY OF THE INVENTION

In a first aspect, the present invention provides a door lock operating device comprising:

- a main frame;
- a knob pivotably mounted to the main frame;
- an inner connecting member pivotably received in the main frame and configured to couple with a push member of a door lock to pivot therewith, wherein the door lock includes an anti-theft latch movable between an anti-theft position and a non-anti-theft position, wherein when the anti-theft latch is in the non-anti-theft position, the inner connecting member is in a non-locking position, and wherein when the anti-theft latch is in the anti-theft position, the inner connecting member is in a locking position;
- an outer connecting member coupled with the knob to pivot therewith and received in the main frame, wherein the outer connecting member and the inner connecting member are jointly pivotable, wherein the outer connecting member is pivotable by the knob to an alert position, a non-alert position, and a retaining position, wherein the retaining position is located between the alert position and the non-alert position in a circumferential direction about a pivotal axis of the outer connecting member, wherein when the outer connecting member is in the retaining position, the inner connecting member is located in one of the locking position and the non-locking position, wherein when the outer connecting member is pivoted by the knob to move from the non-alert position to the retaining position, the outer connecting member actuates the inner connecting member to move from the non-locking position to the locking position, and wherein when the outer connecting member is pivoted from the retaining position to the non-alert position, the outer connecting member actuates the inner connecting member to pivot from the locking position to the non-locking position;
- a handle pivotably mounted to the main frame and configured to couple with a connecting member of the door lock to pivot therewith, wherein the connecting member is operatively connected to a latch of the door lock, wherein pivotal movement of the handle causes movement of the latch from a latching position to an unlatching position, wherein movement of the latch from the latching position to the unlatching position causes movement of the anti-theft latch from the anti-theft position to the non-anti-theft position, such that the inner connecting member pivots from the locking position to the non-locking position, and the outer connecting member pivots from the alert position to the retaining position or pivots from the retaining position to the non-alert position;
- a sensor securely mounted in the main frame, wherein the sensor is activated only when the outer connecting member is in the alert position; and
- an indicating portion including a lighting unit and an indicating member which is movable, wherein the indicating member includes an indicating part through which light is transmits, the indicating member is interlocked with the inner connecting member and the outer connecting member, wherein interlocking between the indicating part and the outer connecting member is independent from interlocking between the inner connecting member and the indicating part, wherein the lighting unit is electrically connected to the sensor and emits light only when the sensor is activated,
- wherein when the inner connecting member is in the non-locking position and the outer connecting member is in the non-alert position, the indicating part of the indicating member is misaligned from the lighting unit,
- wherein when the inner connecting member is in the locking position and the outer connecting member is in the retaining position, the indicating part is aligned with the lighting unit and the lighting unit does not emit light,
- wherein when the inner connecting member is in the locking position and the outer connecting member is in the alert position, the indicating part is aligned with the lighting unit and the lighting unit emits light transmitting through the indicating part, wherein when the outer connecting member is in the retaining position and the inner connecting member is in the non-locking position, the indicating part is aligned with the lighting unit and the lighting unit does not emit light.

The outer connecting member and the inner connecting member may pivot jointly. When the inner connecting member is in the locking position, the outer connecting member may be selectively in the alert position in which the lighting unit emits light to provide an alert effect or not in the alert position in which the lighting unit does not emit light. Thus, when the anti-theft latch of the door lock operating device is in the anti-theft position, the lighting unit can be controlled to or not to emit light, thereby allowing use in an ordinary condition and an emergent condition requiring an alert effect.

In an example, the door lock operating device further comprises a limiting member and a spring plate. The limiting member is securely mounted in the main frame and includes a pivotal portion. The inner connecting member is pivotably connected to the pivotal portion and is movable in an axial direction of the pivotal portion. The outer connecting member includes an outer differential face. The inner connecting member includes an inner differential face. The spring plate is mounted between the inner connecting member and the limiting member. The spring plate biases the inner differential face of the inner connecting member to slidably engage with the outer differential face of the outer connecting member. When the inner connecting member is in the locking position and the outer connecting member pivots to the alert position, the outer differential face slides relative to the inner differential face, such that the inner connecting member displaces in the axial direction of the pivotal portion, and the inner connecting member maintains in the locking position while the outer connecting member is pivoting to the alert position.

The outer differential face of the outer connecting member and the inner differential face of the inner connecting member may abut against each other to permit joint movement, such that the inner connecting member may move in the axial direction of the knob pivotal connection portion. Accordingly, one of the inner connecting member and the outer connecting member may pivot while the other doesn't. Furthermore, by the provision of the spring plate which biases the inner differential face of the inner connecting member to abut against the outer differential face of the outer connecting member, the inner connecting member and the outer connecting member may pivot jointly. This permits control of the lighting unit to or not to emit light while the anti-theft latch is in the anti-theft position.

In an example, the door lock operating device further comprises an interlocking member slidably received in the main frame, wherein the interlocking member has a lower end face, wherein the indicating member is coupled with the interlocking member to move therewith, wherein the inner connecting member further includes an inner swayable arm, wherein the outer connecting member includes an outer swayable arm,

- wherein when the inner connecting member is in the non-locking position and the outer connecting member is in the non-alert position, the interlocking member is biased to an ascended position, such that the indicating part is spaced from the lighting unit,
- wherein when the outer connecting member pivots from the non-alert position to the retaining position, the outer swayable arm actuates the interlocking member to move from the ascended position to a descended position,
- wherein when the inner connecting member is in the locking position and the outer connecting member is in the retaining position, the outer swayable arm presses against the lower end face of the interlocking member to bias the interlocking member to the ascended position,
- wherein when the inner connecting member is in the locking position and the outer connecting member is in the alert position, the inner swayable arm presses against the lower end face of the interlocking member to bias the interlocking member to the ascended position,
- wherein when the interlocking member is in the descended position and the outer connecting member is in the alert position, the indicating part is aligned with the lighting unit which emits light passing through the indicating par to provide an alert effect.

In an example, the inner swayable arm includes a distal end. The lower end face of the interlocking member includes a groove. When the inner connecting member is in the locking position and the outer connecting member is in the retaining position, the distal end of the inner swayable arm disengages from the groove. When the inner connecting member is in the locking position and the outer connecting member pivots toward the alert position, the distal end of the inner swayable arm engages with the groove to maintain the inner connecting member in the locking position while the outer connecting member pivots from the retaining position to the alert position.

The groove of the interlocking member may reliably retain the inner connecting member in the locking position while the outer connecting member is moving from the retaining position to the alert position, such that the lighting unit may emit or not emit light while the anti-theft latch is in the anti-theft position.

In another aspect, a door lock operating device comprises:

- a main frame;
- a knob pivotably mounted to the main frame;
- an outer connecting member coupled with the knob to pivot therewith and received in the main frame, wherein the outer connecting member is pivotable by the knob to an alert position;
- an inner connecting member pivotably received in the main frame and coupled with the outer connecting member to pivot therewith, wherein pivotal movement of the knob interlocks the outer connecting member to actuate the inner connecting member to pivot to between a locking position and a non-locking position, wherein when the outer connecting member is in the alert position, the inner connecting member maintains in the locking position, wherein when the inner connecting member is in the locking position, the outer connecting member is selectively pivoted to the alert position, wherein the inner connecting member is configured to couple with an anti-theft latch, wherein when the inner connecting member pivots from the non-locking position to the locking position, the anti-theft latch moves from a non-anti-theft position to an anti-theft position, and wherein when the inner connecting member pivots from the locking position to the non-locking position, the anti-theft latch moves from the anti-theft position to the non-anti-theft position; and
- an indicating portion disposed an on outer side of the main frame and interlocked with the inner connecting member and the outer connecting member, wherein interlocking between the indicating portion and the outer connecting member is independent from interlocking between the inner connecting member and the indicating portion, wherein the indicating portion indicates the anti-theft latch is in the anti-theft position only when the outer connecting member is in the alert position.

The outer connecting member and the inner connecting member may pivot jointly. When the inner connecting member is in the locking position, the outer connecting member may be selectively in the alert position in which the lighting unit emits light to provide an alert effect or not in the alert position in which the lighting unit does not emit light. Thus, when the anti-theft latch of the door lock operating device is in the anti-theft position, the lighting unit can be controlled to or not to emit light, thereby allowing use in an ordinary condition and an emergent condition requiring an alert effect.

In an example, the door lock operating device further comprises a sensor. The indicating portion includes a lighting unit electrically connected to the sensor. The sensor is activated to cause the lighting unit to emit light for indicating the anti-theft latch is in the anti-theft position only when the outer connecting member is in the alert position.

In an example, wherein the indicating portion further includes an outer cover and an indicating member which is movably received in the outer cover. The indicating member includes an indicating part. The outer cover includes a display area through which light transmits. The indicating member is interlocked with the inner connecting member and the outer connecting member. The interlocking between the indicating member and the outer outer connecting member is independent from the interlocking between the inner connecting member and the indicating member. The outer connecting member is further pivotable to a retaining position and a non-alert position. When the inner connecting member is in the non-locking position and the outer connecting member is not in the retaining position, the indicating member maintains in a position in which the indicating part is misaligned from the lighting unit and the display area. When the inner connecting member is in the non-locking position or the outer connecting member is in the retaining position, the indicating part is aligned with the lighting unit and the display area.

In an example, the outer connecting member further includes an outer swayable arm and is further pivotable by the knob to a non-alert position. When the outer connecting member is in the non-alert position, the inner connecting member maintains in the non-locking position. Wen the outer connecting member is in the alert position, and the outer swayable arm activates the sensor to cause the lighting unit to emit light.

In an example, the door lock operating device further comprises a limiting member and a spring plate. The limiting member is securely mounted in the main frame. The limiting member includes a pivotal portion pivotably connected to the inner connecting member. The outer connecting member includes an outer differential face. The inner connecting member includes an inner differential face. The spring plate is mounted between the inner connecting member and the limiting member. The spring plate biases the inner differential face of the inner connecting member to slidably engage with the outer differential face of the outer connecting member. When the inner connecting member is in the locking position and the outer connecting member pivots to the alert position, the outer differential face slides relative to the inner differential face, such that the inner connecting member displaces in the axial direction of the pivotal portion, and the inner connecting member maintains in the locking position while the outer connecting member is pivoting to the alert position.

The outer differential face of the outer connecting member and the inner differential face of the inner connecting member may abut against each other to permit joint movement, such that the inner connecting member may move in the axial direction of the knob pivotal connection portion. Accordingly, one of the inner connecting member and the outer connecting member may pivot while the other doesn't. Furthermore, by the provision of the spring plate which biases the inner differential face of the inner connecting member to abut against the outer differential face of the outer connecting member, the inner connecting member and the outer connecting member may pivot jointly. This permits control of the lighting unit to or not to emit light while the anti-theft latch is in the anti-theft position.

In an example, the door lock operating device further comprises an interlocking member slidably received in the main frame, wherein the interlocking member has a lower end face, wherein the inner connecting member further includes an inner swayable arm, wherein the outer connecting member includes an outer swayable arm, wherein the indicating portion further includes an indicating member coupled with the interlocking member to move therewith, wherein the indicating member includes an indicating part through which light transmits, wherein the outer connecting member is further pivotable by the knob to a non-alert position and a retaining position located between the alert position and the non-alert position in a circumferential direction about a pivotal axis of the outer connecting member, wherein when the inner connecting member is in the locking position, the outer connecting member is in one of the retaining position and the alert position, wherein when the outer connecting member is in the retaining position, the inner connecting member is in one of the locking position and the non-locking position, wherein when the inner connecting member is in the non-locking position and the outer connecting member is in the non-alert position, the interlocking member is biased to an ascended position, such that the indicating part is spaced from the lighting unit, wherein when the outer connecting member pivots from the non-alert position to the retaining position, the outer swayable arm actuates the interlocking member to move from the ascended position to a descended position, wherein when the inner connecting member is in the locking position and the outer connecting member is in the retaining position, the outer swayable arm presses against the lower end face of the interlocking member to bias the interlocking member to the descended position, wherein when the inner connecting member is in the locking position and the outer connecting member is in the alert position, the inner swayable arm presses against the lower end face of the interlocking member to bias the interlocking member to the descended position, wherein when the interlocking member is in the descended position and the outer connecting member is in the alert position, the indicating part is aligned with the lighting unit which emits light passing through the indicating par to provide an alert effect.

In an example, the indicating portion further includes an outer cover. The outer cover includes a display area aligned with the lighting unit and through which light transmits. The indicating member is located on an inner side of the outer cover. When the interlocking member is in the ascended position, the indicating part is misaligned from the display area and the lighting unit. When the interlocking member is in the descended position, the indicating part is aligned with the lighting unit and the display area.

The groove of the interlocking member may reliably retain the inner connecting member in the locking position while the outer connecting member is moving from the retaining position to the alert position, such that the lighting unit may emit or not emit light while the anti-theft latch is in the anti-theft position.

In an example, the inner swayable arm includes a distal end. The lower end face of the interlocking member includes a groove. When the inner connecting member is in the locking position and the outer connecting member is in the retaining position, the distal end of the inner swayable arm disengages from the groove. When the inner connecting member is in the locking position and the outer connecting member pivots toward the alert position, the distal end of the inner swayable arm engages with the groove to maintain the inner connecting member in the locking position while the outer connecting member pivots from the retaining position to the alert position.

In an example, the door lock operating device further comprises a supporting member and a spring. The supporting member is securely mounted in the main frame. The supporting member includes a supporting end. The interlocking member further includes an upper engaging end spaced from the lower end face. The supporting end is located between the upper engaging end and the lower end face. The spring is coupled with the upper engaging end and the supporting end. The spring biases the interlocking member to the ascended position.

In an example, the door lock operating device further comprises a handle pivotably connected to the main frame and configured to be coupled with a connecting member of a door lock to pivot therewith. The connecting member is interlocked with a latch of the door lock, wherein the latch is interlocked with the anti-theft latch. When the outer connecting member is in either of the alert position and the retaining position, pivotal movement of the handle causes movement of the latch from a latching position to an unlatching position, which, in turn, causes movement of the anti-theft latch from the anti-theft position to the non-anti-theft position, thereby pivoting the inner connecting member from the locking position to the non-locking position, and the outer connecting member in the alert position leaves the alert position, or the outer connecting member in the retaining position pivots from the retaining position to the non-alert position.

In a further aspect, the present invention provides a door lock operating device comprising:

- an operating portion including an outer connecting member configured to be interlocked with an anti-theft latch of a door lock, wherein pivotal movement of the outer connecting member moves the anti-theft latch between an anti-theft position and a non-anti-theft position;
- a sensor securely mounted in the operating portion; and
- an indicating portion including a lighting unit electrically connected to the sensor, wherein the outer connecting member is configured not to activate the sensor to avoid the lighting unit from emitting light when the anti-theft latch is in the non-anti-theft position, and wherein when the anti-theft latch is in the anti-theft position, the sensor is activated by the outer connecting member to cause the lighting unit to emit light.

The lighting unit may be selected to emit or not to emit light when the anti-theft latch is in the anti-theft position. Thus, the indicating portion is applicable in both an ordinary condition and an emergent condition (in which the anti-theft latch is in the anti-theft position must be indicated). Therefore, mistaken operation by a person to move the anti-theft latch to the non-anti-theft position can be avoided in an emergent condition.

The present invention will become clearer in light of the following detailed description of illustrative embodiments of this invention described in connection with the drawings.

Figure 1:
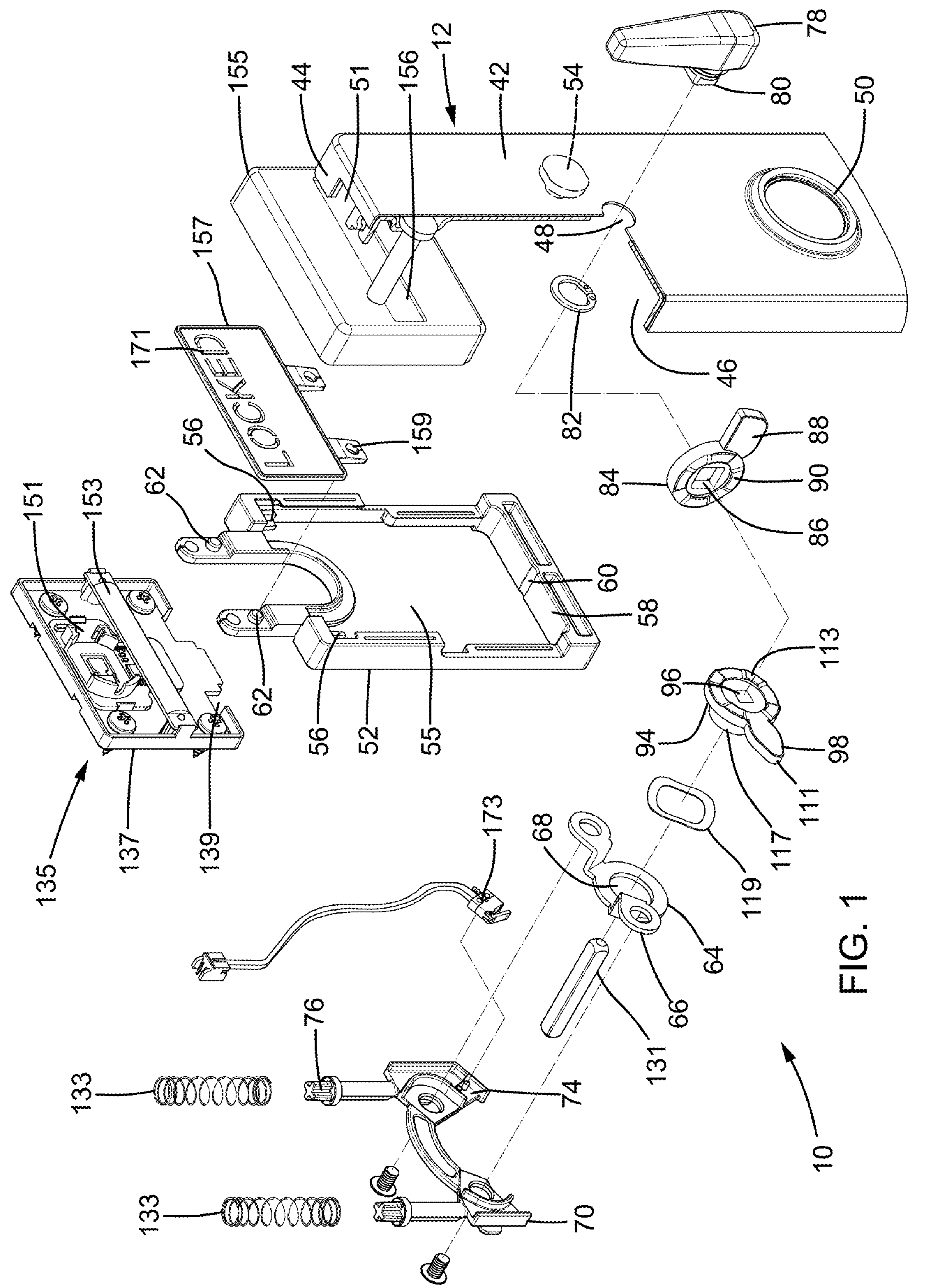
FIG. 1 is an exploded, perspective view of a door operating device according to the present invention.
Figure 2:
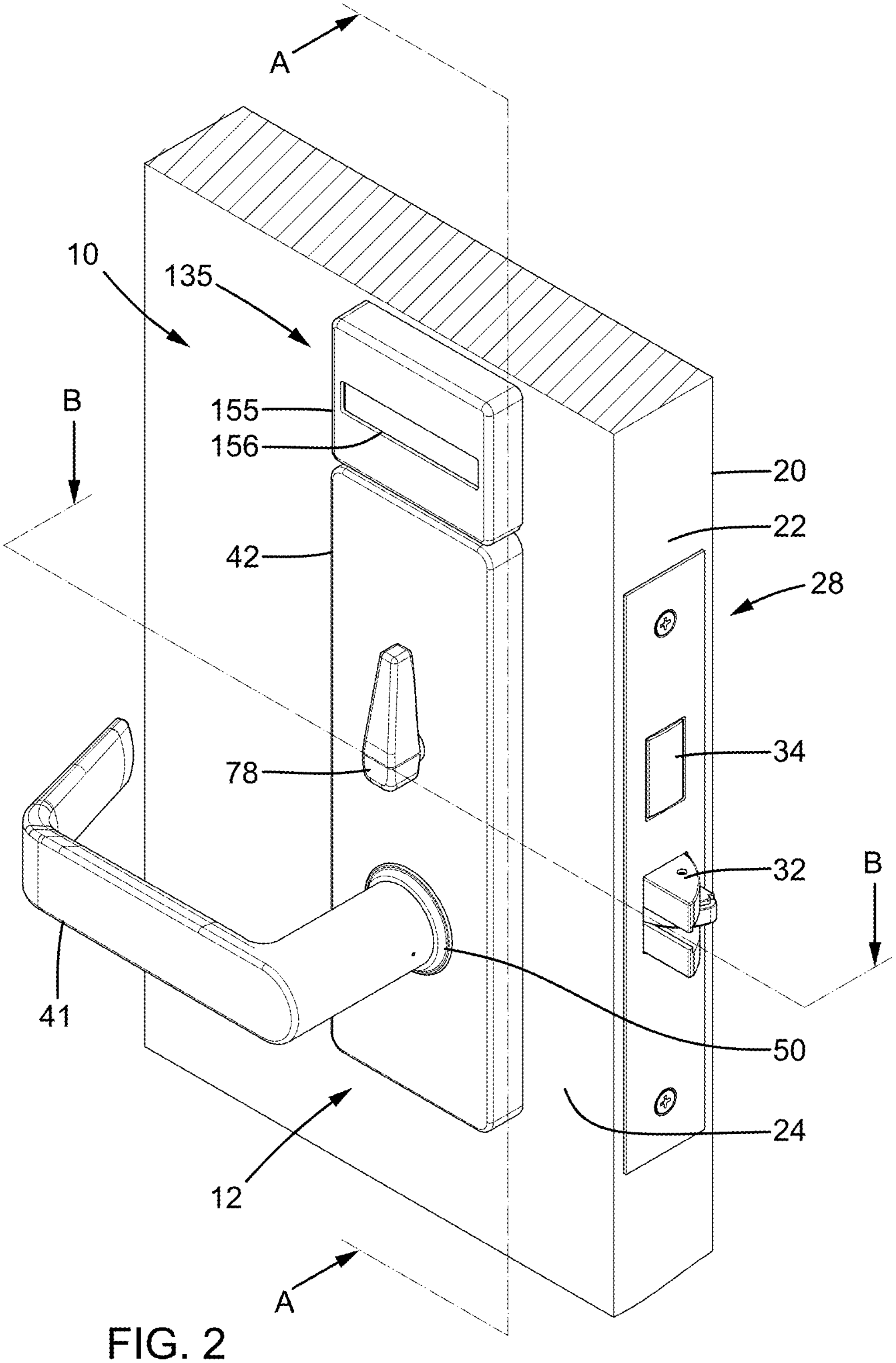
FIG. 2 is a perspective view illustrating the door operating device according to the present invention installed on a door and matched with a door lock.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “lower”, “upper”, “inner”, “outer”, “side”, “end”, “portion”, “section”, “longitudinal”, “axial”, “radial”, “circumferential”, “centrifugal”, “lateral”, “horizontal”, “vertical”, “annular”, “outward”, “inward”, “spacing”, “clockwise”, “counterclockwise”, “length”, “width”, “height”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

The present invention relates to a door lock operating device with an alert function and, more particularly, to a door lock operating device for a box-shaped door lock. With reference to FIGS. 1-5, 6A and 6B, the door lock operating device 10 is securely mounted on a door 20 and is used to operate a door lock 28 mounted to the door 20. The door 20 includes a side 24 and an end face 24 extending perpendicular to the side 24. The door 20 further includes a space 26 extending inward from the end face 22. It is worth mentioning that the door operating device 10 may be but not limited to be disposed on the indoor side. The door lock 28 may be but not limited to be operatively connected to another door operating device mounted to another side of the door. The door lock operating device 10 on the indoor side and the door operating device on the outdoor side may be operated independently to operate the door lock 28. The door operating device on the outdoor side is not the subject matter of the preset invention and is, thus, not described in the specification nor illustrated in the drawings.

Figure 6A:
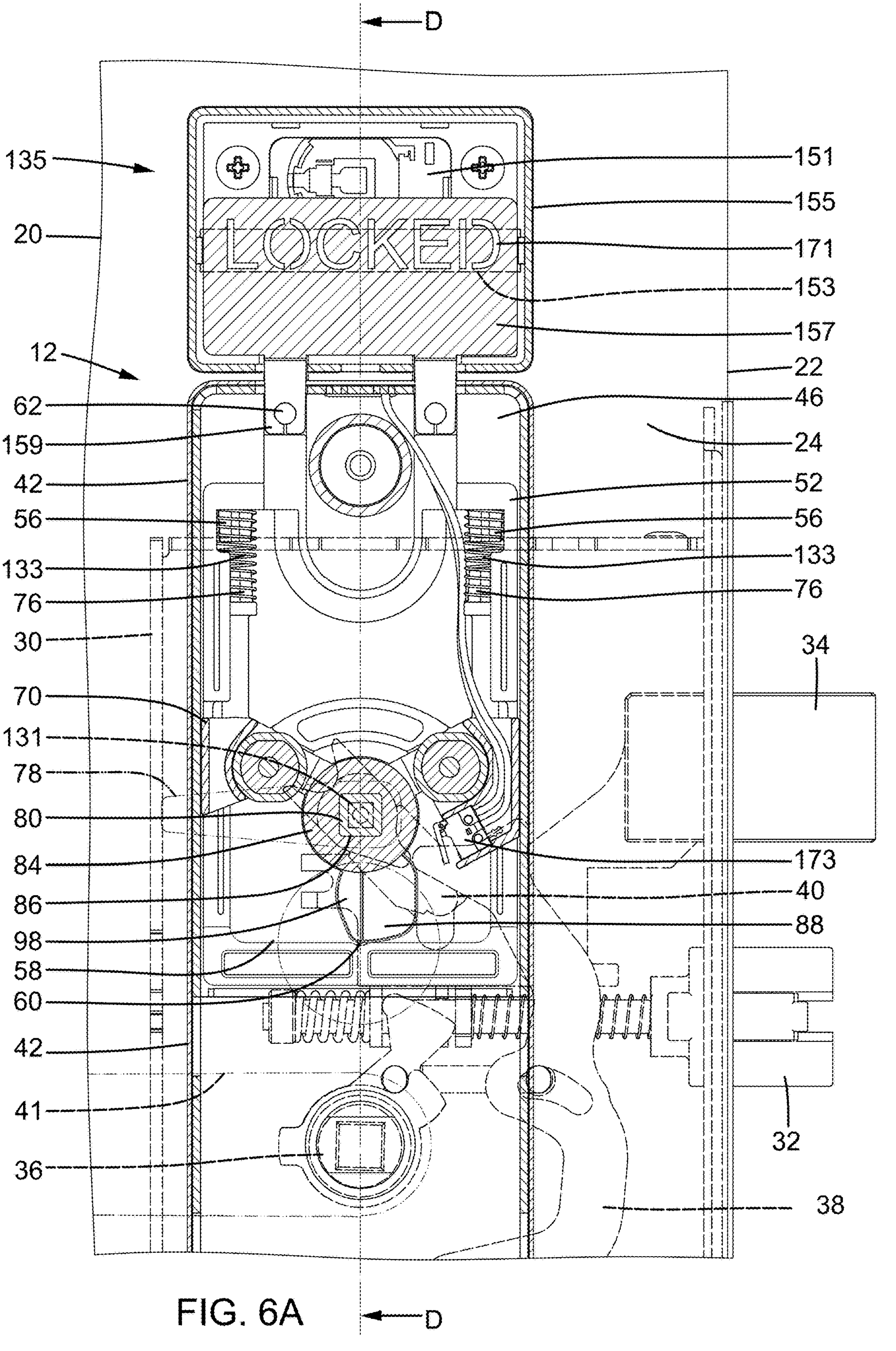
FIG. 6A is a view similar to FIG. 3, with an inner connecting member in a locking position and with an outer connecting member in a retaining position.
Figure 6B:
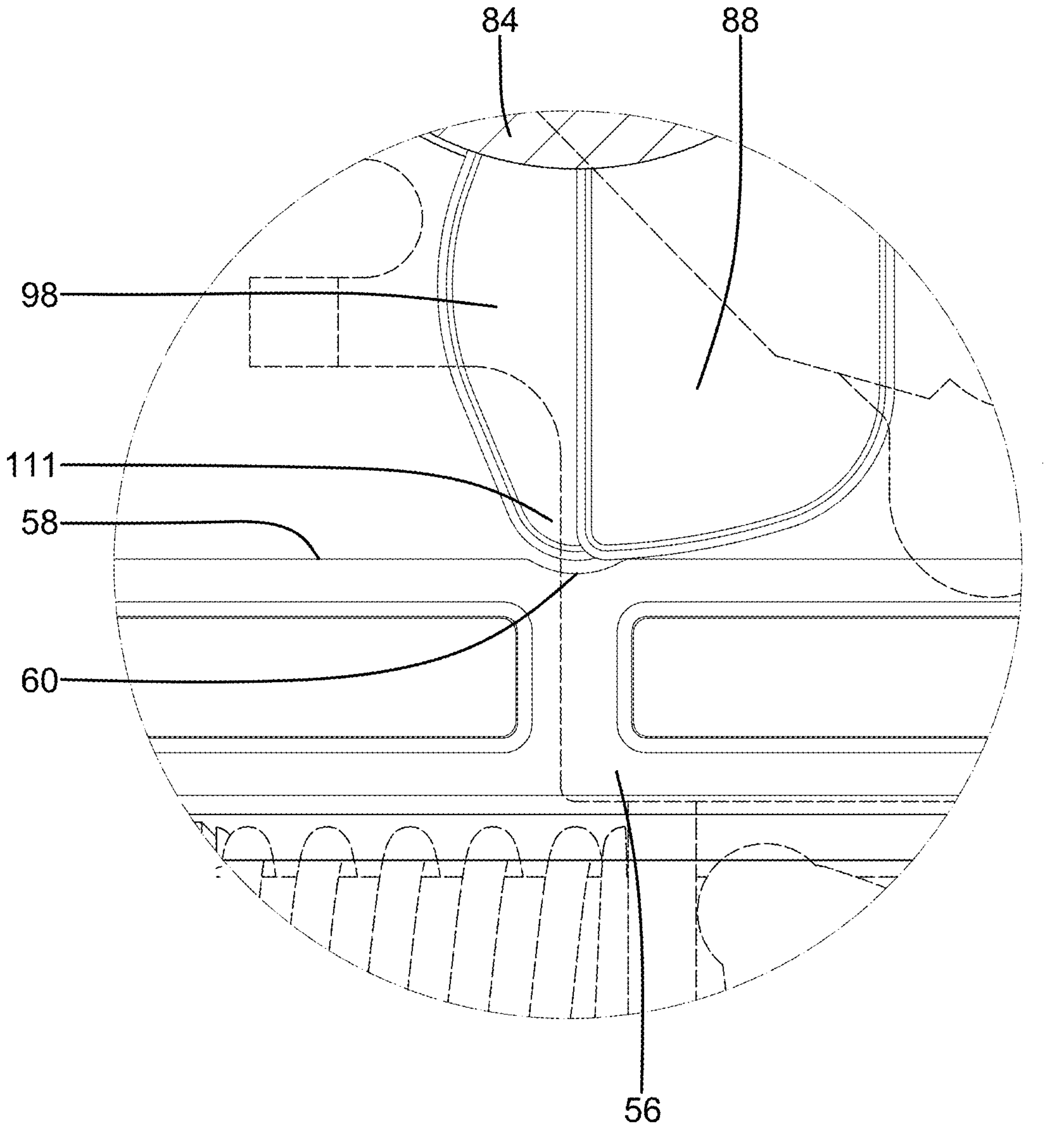
FIG. 6B is an enlarged view of a circled portion of FIG. 6A.
Figure 8:
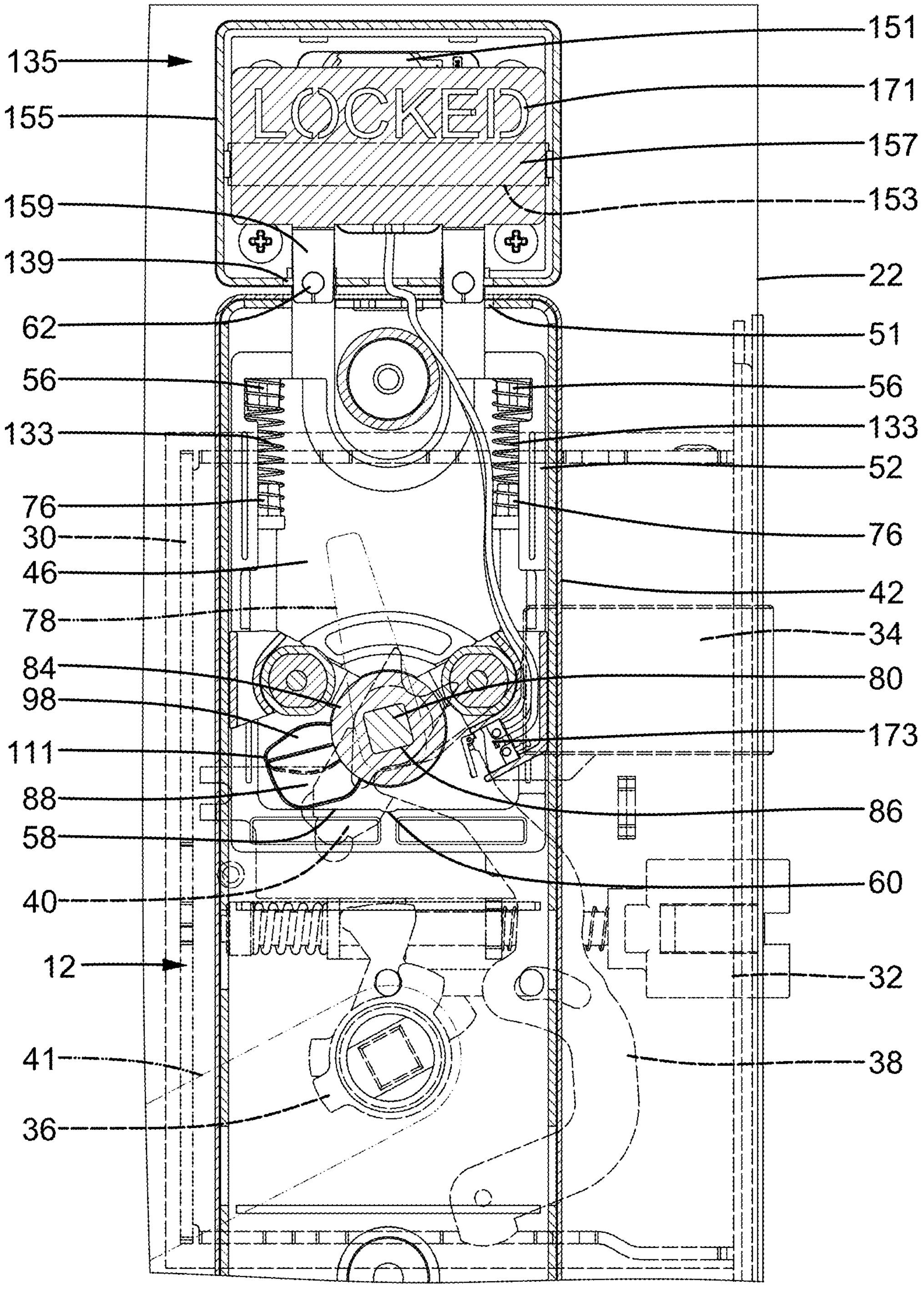
FIG. 8 is a view similar to FIG. 3, with a handle operated to move a latch to an unlatching position, with the inner connecting member pivoted to a non-locking position, and with the outer connecting member pivoted to a non-alert position.
Figure 9:
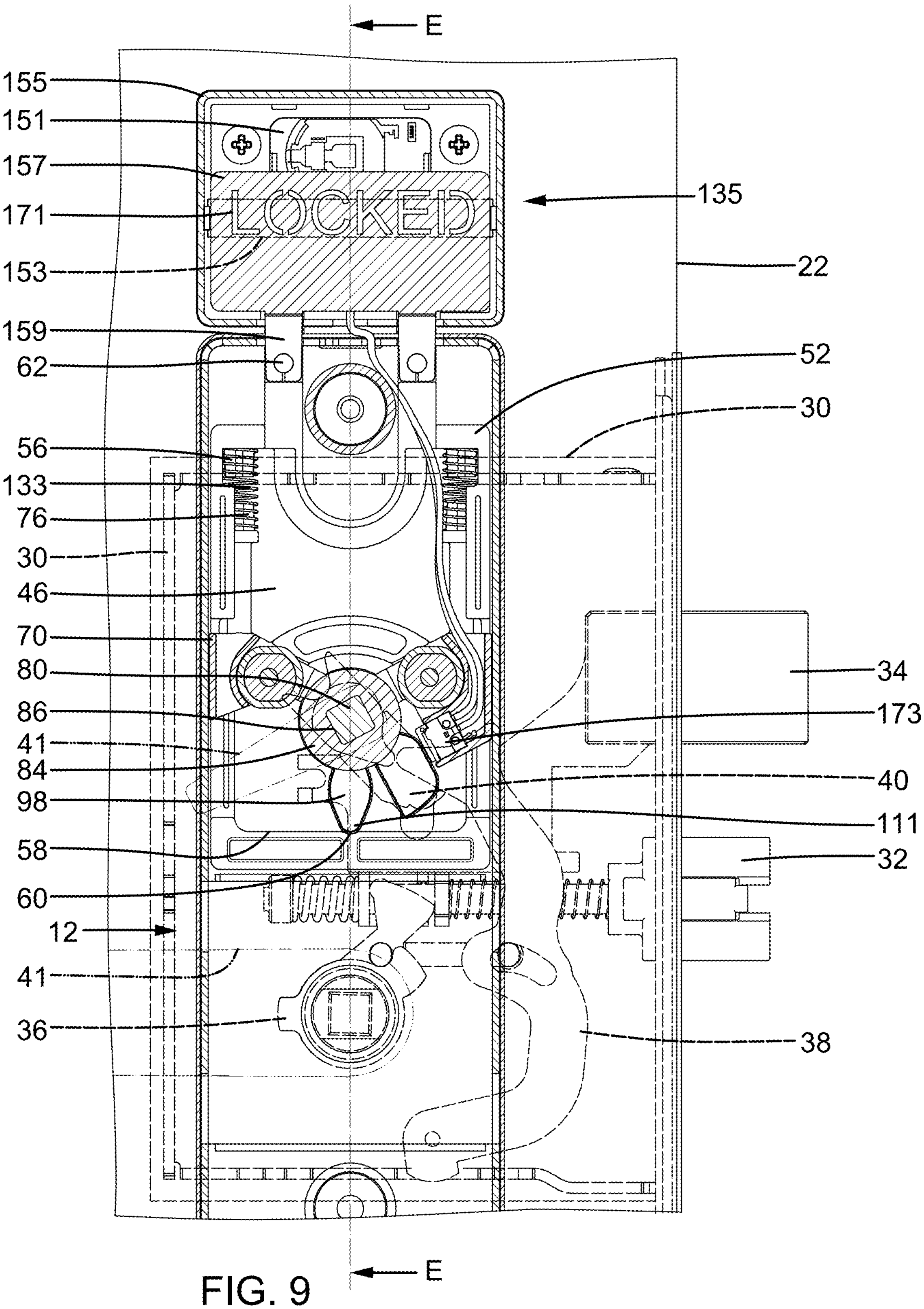
FIG. 9 is a view similar to FIG. 3, with an anti-theft latch in an anti-theft position and with a lighting element emitting light.
Figure 10:
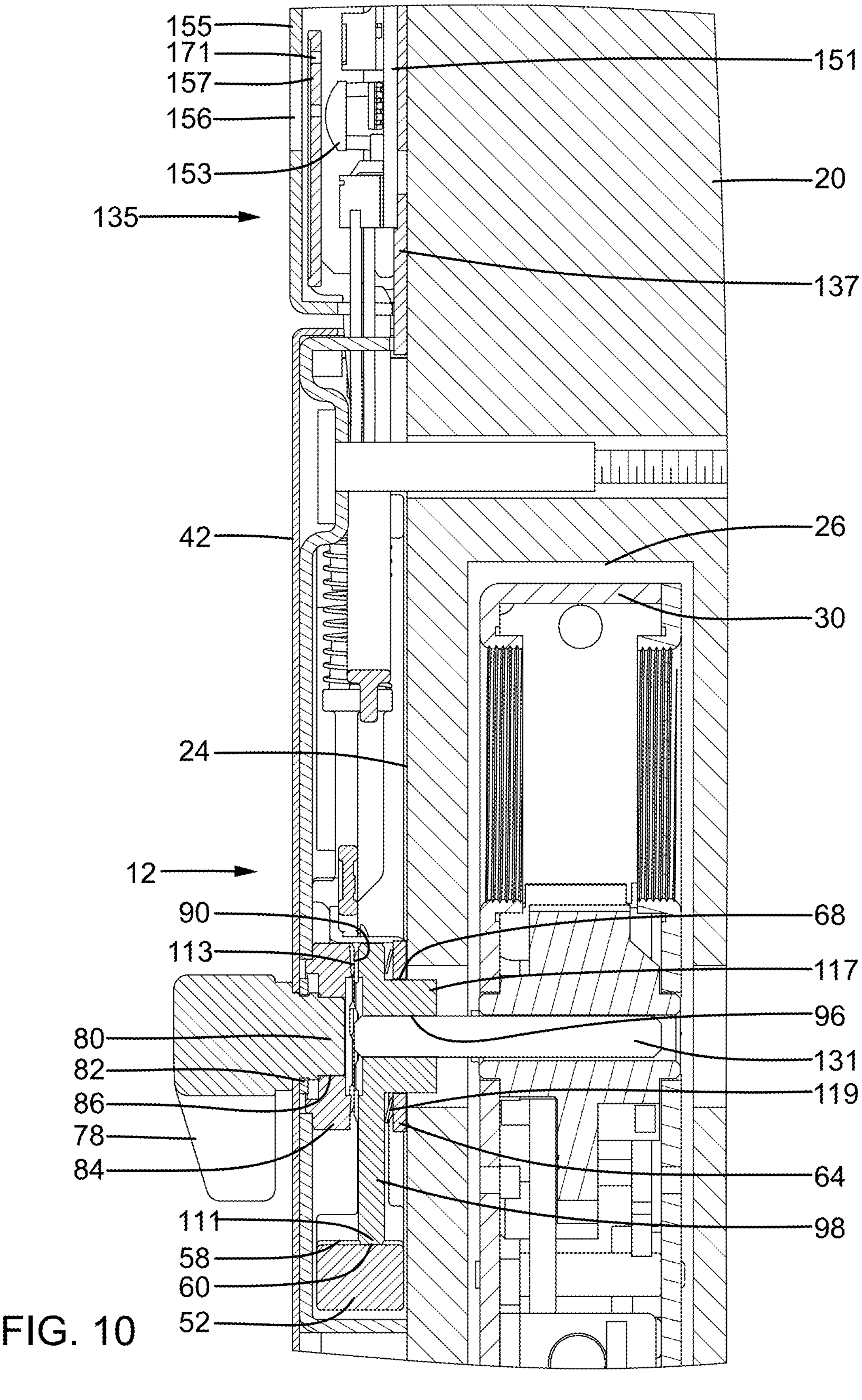
FIG. 10 is a cross sectional view taken along section line E-E of FIG. 9.
Figure 11:
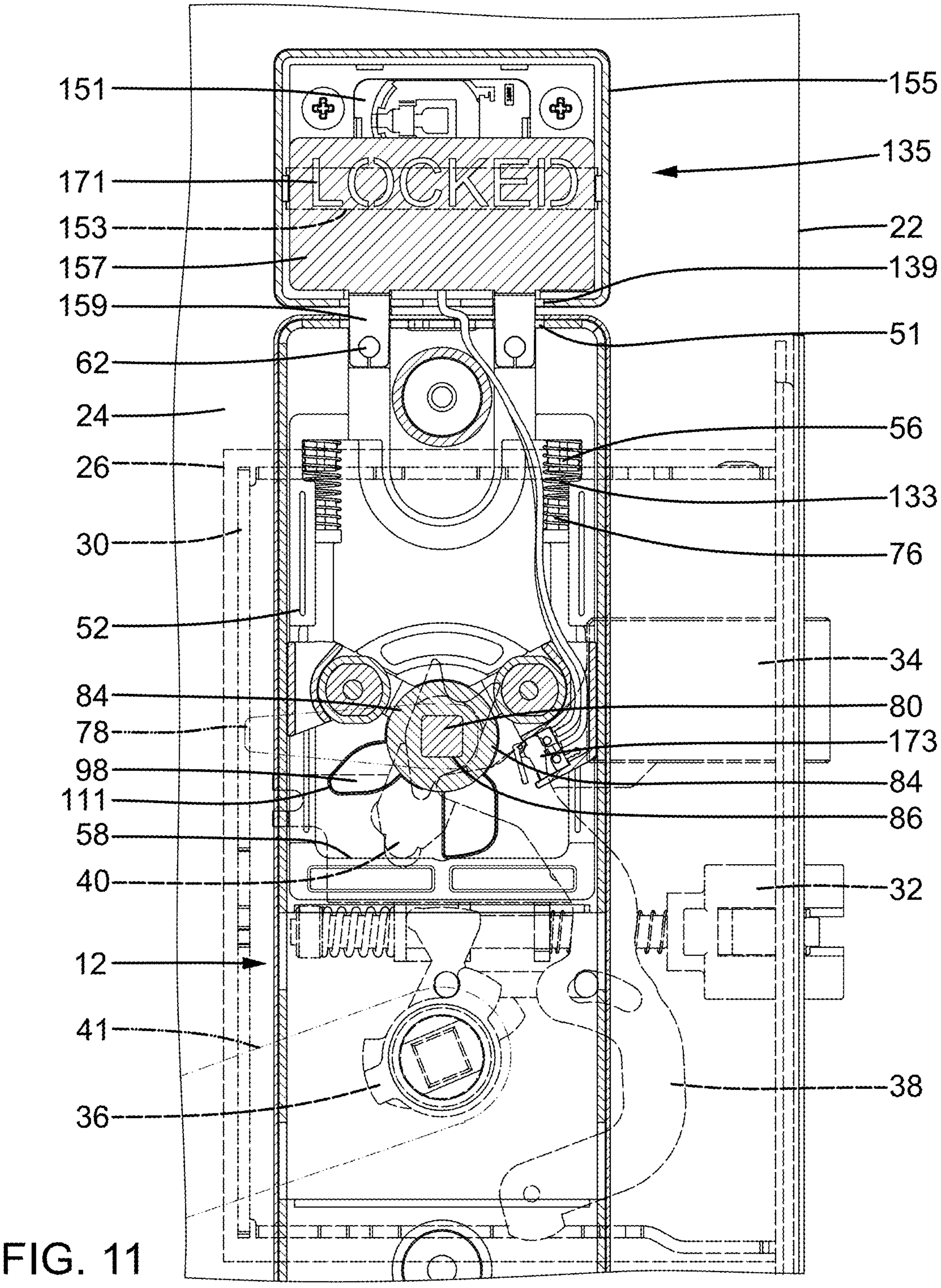
FIG. 11 is a view similar to FIG. 8, with the outer connecting member in the retaining position and with the inner connecting member pivoted to the non-locking position in response to movement of the anti-theft latch to the non-anti-theft position.

The door lock 28 includes a casing 30, a latch 32 movably coupled to the case 30, and an anti-theft latch 34 interlocked with the latch 32. The door lock 28 further includes a connecting member 36 pivotably connected to the case 30, a swayable member 38, and a push member 40. The connecting member 36 may actuate the latch 32 to an extended, latching position (FIGS. 3, 6A, 6B, 9) and a retracted, unlatching position (FIGS. 8 and 11). The push member 40 is interlocked with the anti-theft latch 34 and is pivotable to move the anti-theft latch 34 to a retracted, non-anti-theft position (FIGS. 3, 8, and 11) and an extended, anti-theft position (FIGS. 6A, 6B, and 9). The swayable member 38 is interlocked with the connecting member 36 and the push member 40. When the connecting member 36 pivots to move the latch 32 from the latching position to the unlatching position, the swayable member 38 is pivoted by the connecting member 36 to pivot the push member 40, which, in turn, moves the anti-theft latch 34 from the anti-theft position to the non-anti-theft position.

The door lock 28 is received in the space 26. The latch 32 in the latching position protrudes outward beyond the end face 22. The anti-theft latch 34 in the anti-theft position protrudes outward beyond the end face 22. The handle 41 and the connecting member 36 are coupled to pivot jointly.

The door lock operating device 10 includes an operating portion 12 and an indicating portion 135 disposed on an outer side of the operating portion 12. The operating portion 12 includes a main frame 42 securely mounted on the side 24 of the door 20. The main frame 42 includes a compartment 46 and two coupling portions 54 contiguous to the compartment 46. The main frame 42 further includes a knob pivotal connection portion 48 and a handle pivotal connection portion 50. Each of the knob pivotal connection portion 48 and the handle pivotal connection portion 50 intercommunicates with the compartment 46. The main frame 42 further includes an upper end 44 and a plurality of notches 51 formed on the upper end 44. A handle 41 is pivotably coupled to the handle pivotal connection portion 50.

The door lock operating device 10 includes a knob 78 pivotably connected to the main frame 42 and a retainer 82. The knob 78 includes a coupling end 80 having a distal end with non-circular cross sections. The coupling end 80 of the knob 78 is pivotably connected to the knob pivotal connection portion 48 of the main frame 42. The distal end of the coupling end 80 is received in the compartment 46. The retainer 82 is received in the compartment 46 and is coupled with the coupling end 80, such that the knob 78 cannot move in an axial direction of the knob pivotal connection portion 48.

The door lock operating device 10 further includes an outer connecting member 84 which is coupled with the knob 78 to pivot therewith and which is received in the compartment 46 of the main frame 42. The outer connecting member 84 includes an outer swayable arm 88 protruding outward from an outer periphery of the outer connecting member 84. The outer connecting member 84 further includes an outer coupling hole 86 having non-circular cross sections and an outer differential face 90 on an outer side of the outer connecting member 84. The outer differential face 90 may be but not limited to be comprised of a plurality of concave faces and convex faces. The concave faces and the convex faces are continuously and alternatingly disposed in a circumferential direction. The outer coupling hole 86 is coupled with the coupling end 80 of the knob 78. Thus, when the knob 78 pivots, the outer connecting member 84 is interlocked to pivot jointly. Furthermore, the outer connecting member 84 is located between the two coupling portions 54.

A limiting member 64 and a supporting member 70 are securely mounted to the two coupling portions 54. Specifically, the limiting member 64 includes two lugs 66 and a pivotal portion 68 between the two lugs 66. The two lugs 66 of the limiting member 64 are securely mounted around the two coupling portions 54. An axial direction of the pivotal portion 68 is aligned with the axial direction of the knob pivotal connection portion 48. The outer connecting member 84 is located between the main frame 42 and the limiting member 64. The pivotal portion 68 of the limiting member 64 is spaced from the outer differential face 90 in the axial direction.

The supporting member 70 includes two supporting ends 76 spaced from each other and a mounting portion 74. The two supporting ends 76 face the upper end 44 of the main frame 42. The supporting member 70 is securely mounted to the two coupling portions 54 by two screws and is located in the compartment 46. Two springs 133 are disposed between the two supporting ends 76 and two upper engaging ends 56 of an interlocking member 52.

An inner connecting member 94 is pivotably received in the main frame 42 and is jointly pivotable with the knob 78. The inner connecting member 94 is substantially jointly pivotable with the knob 78 via the outer connecting member 84. The inner connecting member 94 includes an inner swayable arm 98 protruding outwardly from an outer periphery of the inner connecting member 94 and a pivotal end 117. The pivotal end 117 extends in the axial direction of the knob pivotal connection portion 48. The inner connecting member 94 extends in a radial direction perpendicular to the axial direction of the pivotal portion 68. The inner swayable arm 98 includes a distal end 111. The inner connecting member 94 further includes an inner coupling hole 96 having non-circular cross sections and an inner differential face 113 formed on an outer side of the inner connecting member 94. The inner differential face 113 may be but not limited to be comprised of a plurality of concave faces and convex faces. The concave faces and the convex faces are continuously and alternatingly disposed in a circumferential direction.

The pivotal end 117 of the inner connecting member 94 is pivotably coupled with the pivotal portion 68 of the limiting member 64. The inner differential face 113 faces the outer differential face 90. The pivotal end 117 is also coupled with a spring plate 119 which is annular and has an arched portion in this embodiment. The spring plate 119 biases the inner differential face 113 of the inner connecting member 94 to abut against the outer differential face 90 of the outer connecting member 84, such that the outer connecting member 84 and the inner connecting member 94 can pivot jointly.

The inner coupling hole 96 of the inner connecting member 94 is coupled with an end of an interlocking pin 131 to pivot therewith. Another end of the interlocking pin 131 is coupled with the push member 40 to pivot therewith.

Thus, when the inner connecting member 94 pivots, the push member 40 and the anti-theft latch 34 are actuated. Therefore, when the push member 40 pivots, the anti-theft latch 34 and the inner connecting member 94 are also actuated.

The interlocking member 52 is slidably received in the main frame 42. The interlocking member 52 includes a lower end face 58 opposite to the two upper engaging ends 56. The interlocking member 52 further includes two interlocking ends 62 extending outward from the upper end 44 of the main frame 42. The two upper engaging ends 56 are located between the two interlocking ends 62 and the lower end face 58. The lower end face 58 has a groove 60 in a central portion thereof. Furthermore, the interlocking member 52 includes a chamber 55 between the two upper engaging ends 56 and the lower end face 58.

The interlocking member 52 is slidably received in the compartment 46. The supporting member 70 abuts a surface of the interlocking member 52. Thus, the interlocking member 52 is restricted between the main frame 42 and the limiting member 64. The outer connecting member 84, the inner connecting member 94, and the two supporting ends 76 are located in the chamber 55. The two supporting ends 76 are located between the two upper engaging ends 56 and the lower end face 58 in a longitudinal direction perpendicular to the axial direction of the knob pivotal connection portion 48. The outer connecting member 84 and the inner connecting member 94 are located between the two supporting ends 76 and the lower end face 58 in the longitudinal direction. The two interlocking ends 62 protrude beyond the main frame 42 via the notches 51 of the main frame 42.

The indicating portion 135 includes a subframe 137 which has an opening 139 at a lower end thereof. A control circuit 151 and a lighting unit 153 are securely disposed in the subframe 137 and are electrically connected to each other. An outer cover 155 is securely mounted to an outer side of the subframe 137. The outer cover 155 includes a display area 156 which may be but not limited to an opening or an area made of light transmittable material. The indicating portion 135 further includes an indicating member 157 movably coupled with the inner connecting member 94 and the outer connecting member 84. The indicating member 157 includes an indicating part 171 and two interlocking portions 159 on a lower end of the indicating part 171.

The indicating member 157 is movably received between the outer cover 155 and the lighting unit 153 and is interlocked with the outer connecting member 84 and the inner connecting member 94. The interlocking between the indicating part 171 and the outer swayable arm 88 is independent from the interlocking between the inner connecting member 94 and the indicating part 171. The two interlocking portions 159 protrude beyond the subframe 137 via the opening 139 and are coupled with the two interlocking ends 62. It can be appreciated that the indicating member 157 is interlocked with each of the inner connecting member 94 and the outer connecting member 84 via the interlocking member 52. Thus, when the interlocking member 52 displaces, the indicating member 157 moves together with the interlocking member 52. Light can only transmit the indicating member 157 via the indicating part 171 which may be but not limited to have an open area with a specific shape or made of light transmittable material. In the example shown, the indicating part 171 is comprised of openings showing letters "LOCKED".

A sensor 173 is securely disposed on the mounting portion 74 of the supporting member 70. The sensor 173 is electrically connected to the control circuit 151 by a wire extending through the notch 51 and the opening 139. Thus, lighting and not lighting of the lighting unit 153 can be controlled through activation and non-activation of the sensor 173.

Now that the basic construction of the door lock operating device 10 of the present invention has been explained, the operation and some of the advantages of the door lock operating device 10 can be set forth and appreciated. In particular, with reference to FIGS. 3-5, for the sake of explanation, it will be assumed that the latch 32 of the door lock 28 is in the latching position, and the anti-theft latch 34 is in the non-anti-theft position. In this state, the interlocking member 52 is biased by the two springs 133 to an ascended position in which the indicating part 171 of the indicating member 157 is spaced from the lighting unit 153 and the display area 156. Namely, the lighting unit 153 is blocked by the indicating member 157. Furthermore, the inner connecting member 94 is in a non-alert position. The outer swayable arm 88 of the outer connecting member 84 is substantially in a horizontal state and abuts the lower end face 58 of the interlocking member 52. The inner swayable arm 98 of the inner connecting member 94 is substantially in a horizontal state and is aligned with the outer swayable arm 88 but is spaced from the lower end face 58 of the interlocking member 52. The spring plate 119 biases the inner connecting member 94 to abut the inner differential face 113 against the outer differential face 90. In this state, when the handle 41 is pivoted, the connecting member 36 will be interlocked to move the latch 32 from the latching position to the unlatching position.

Figure 3:
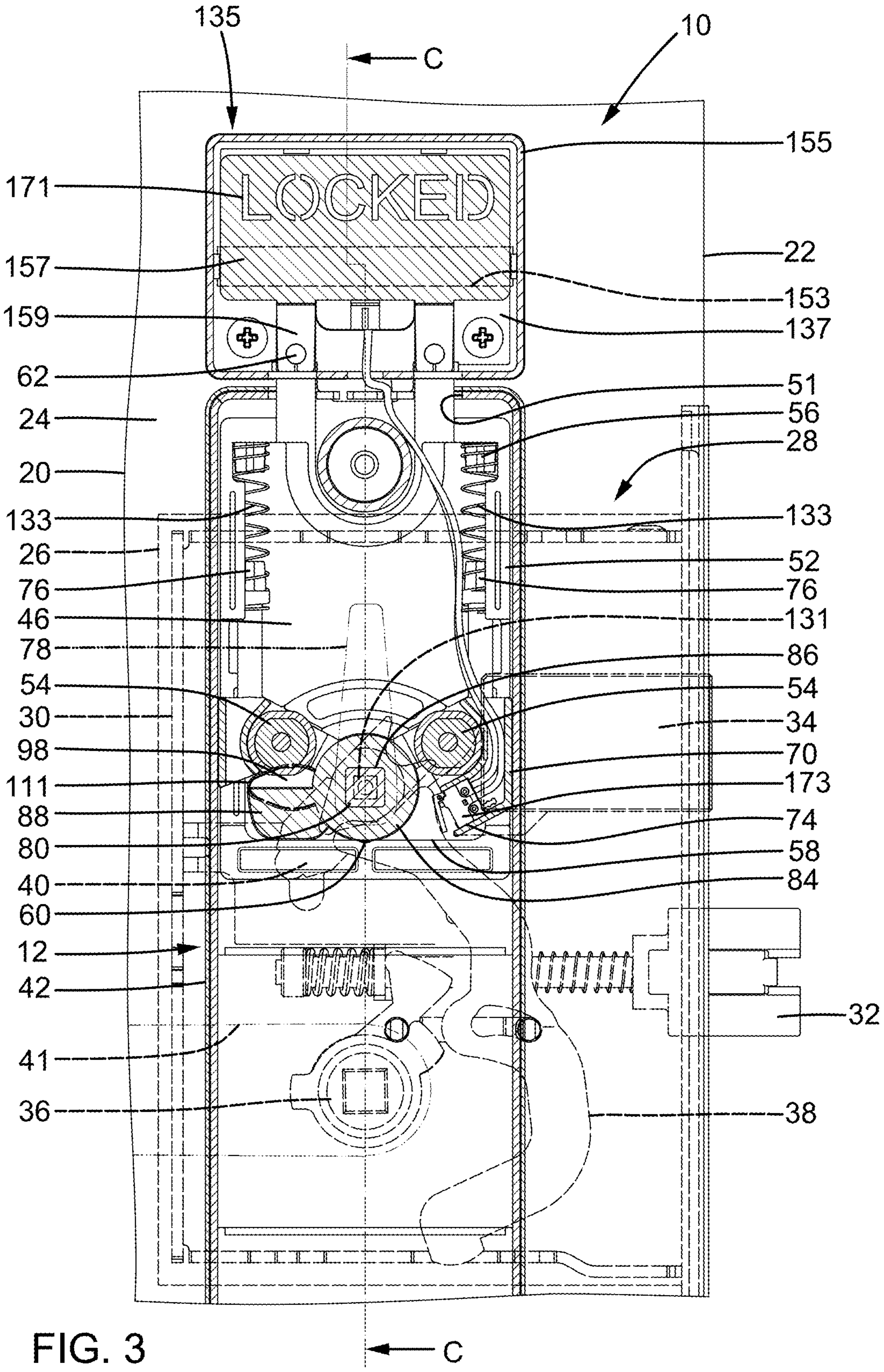
FIG. 3 is a cross sectional view taken along section line A-A of FIG. 2.
Figure 4:
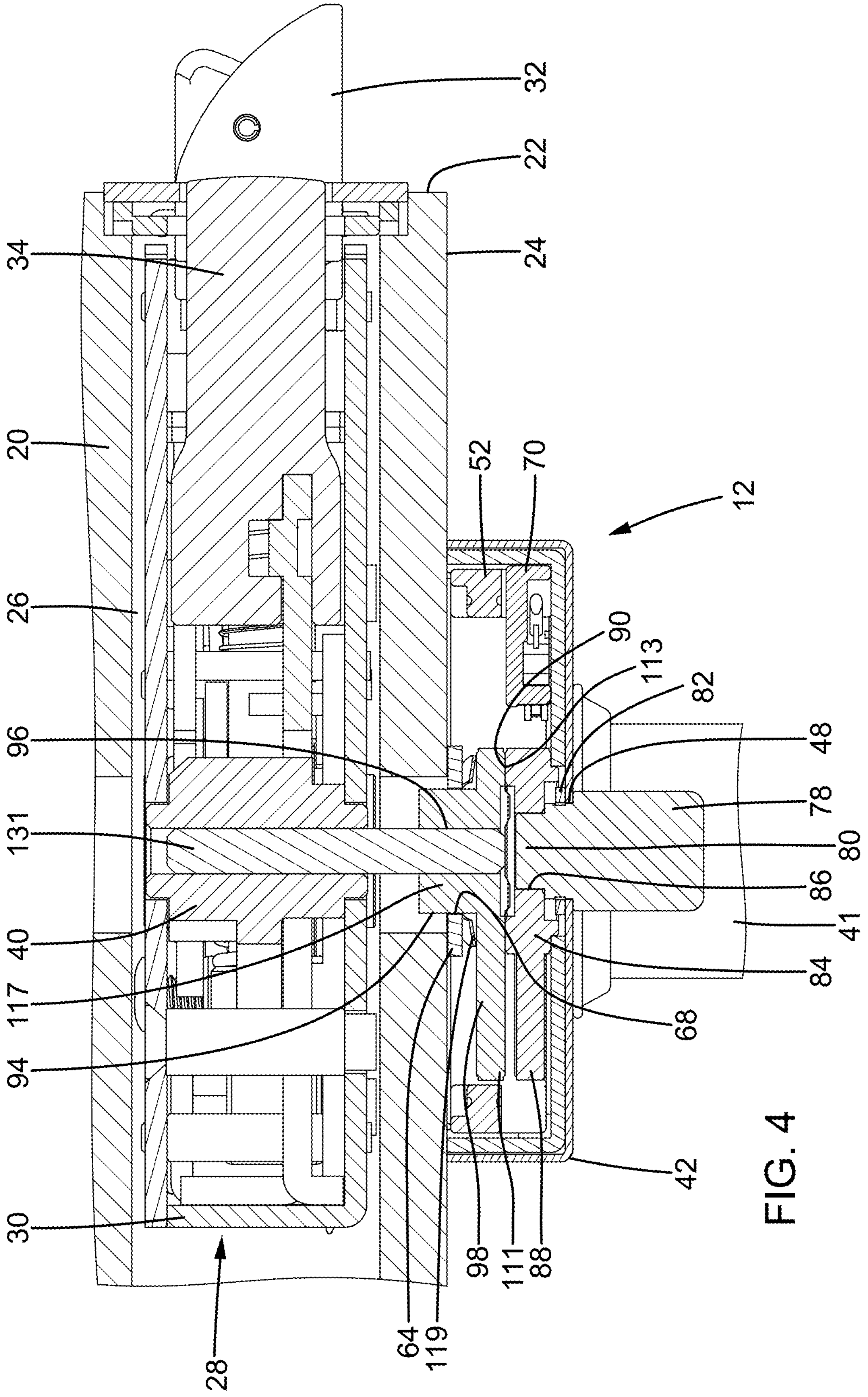
FIG. 4 is a cross sectional view taken along section line B-B of FIG. 2.
Figure 5:
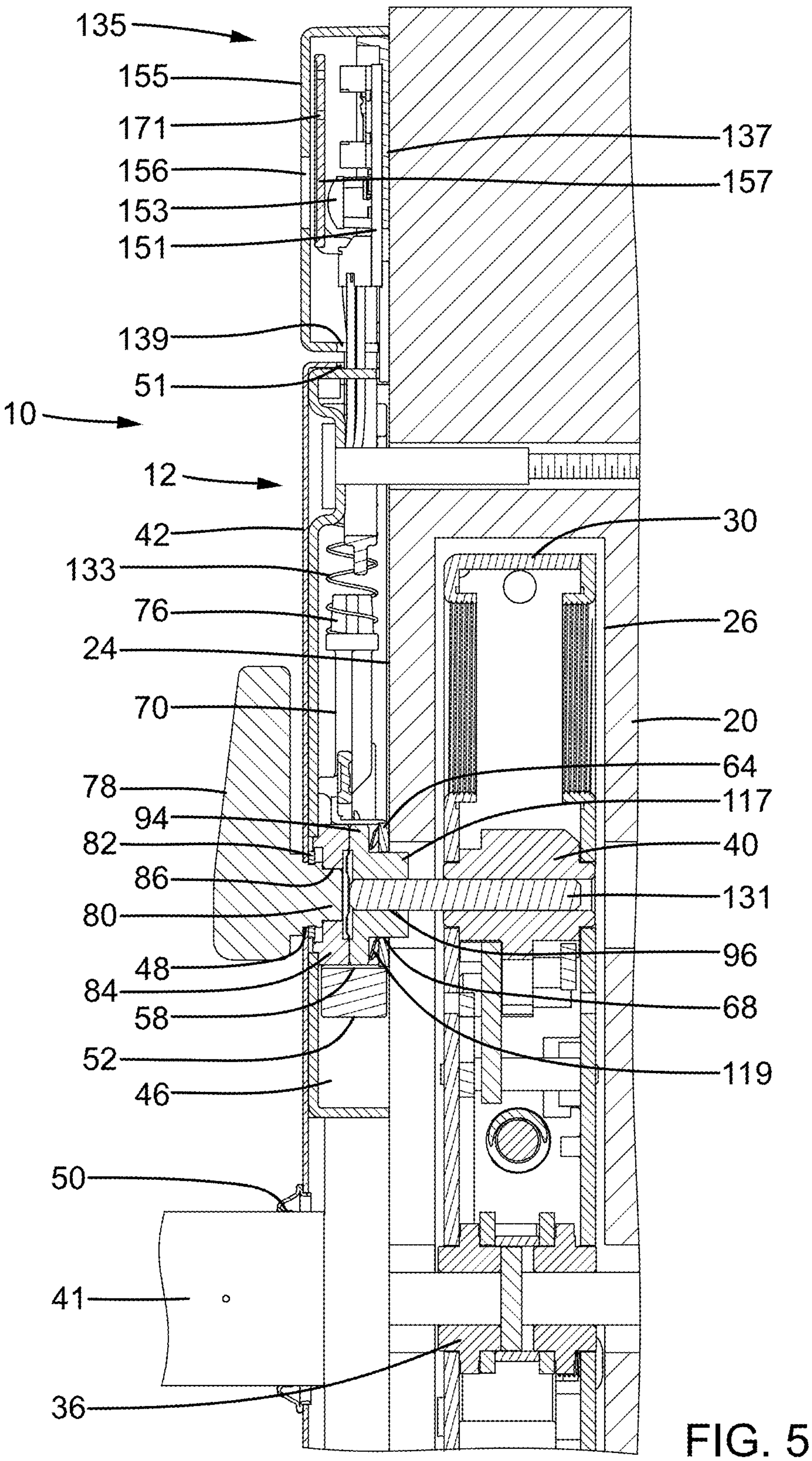
FIG. 5 is a cross sectional taken along section line C-C of FIG. 3.

With reference to FIGS. 3, 6A, and 6B, when the knob 78 and the outer connecting member 84 are pivoted 90° in the counterclockwise direction (c.f. FIG. 3), the outer differential face 90 actuates the inner differential face 113, such that the inner connecting member 94 pivots jointly with the knob 78 and the outer connecting member 84. Thus, when the outer connecting member 84 pivots from the non-alert position to a retaining position, the inner connecting member 94 pivots from the non-locking position to the locking position. The outer swayable arm 88 presses against the lower end face 58 of the interlocking member 52 to move the interlocking member 52 from the ascended position to a descended position while compressing the two springs 133.

With reference to FIGS. 6A and 6B, it is noted that during the movement from the non-alert position to the retaining position (and the inner connecting member 94 is interlocked to move from the non-locking position to the locking position at the same time), the inner swayable arm 98 is substantially still spaced from the lower end face 58 of the interlocking member 52. Even though the outer connecting member 84 pivots to the locking position, the distal end 111 of the inner swayable arm 98 is still spaced from the lower end face 58 of the interlocking member 52. At this time, the outer swayable arm 88 presses against the lower end face 58 of the interlocking member 52 to retain the interlocking member 52 in the descended position. Pivotal movement of the inner connecting member 94 causes movement of the interlocking pin 131 to interlock the push member 40 to pivot therewith, resulting in movement of the anti-theft latch 34 from the non-anti-theft position to the anti-theft position.

Figure 7:
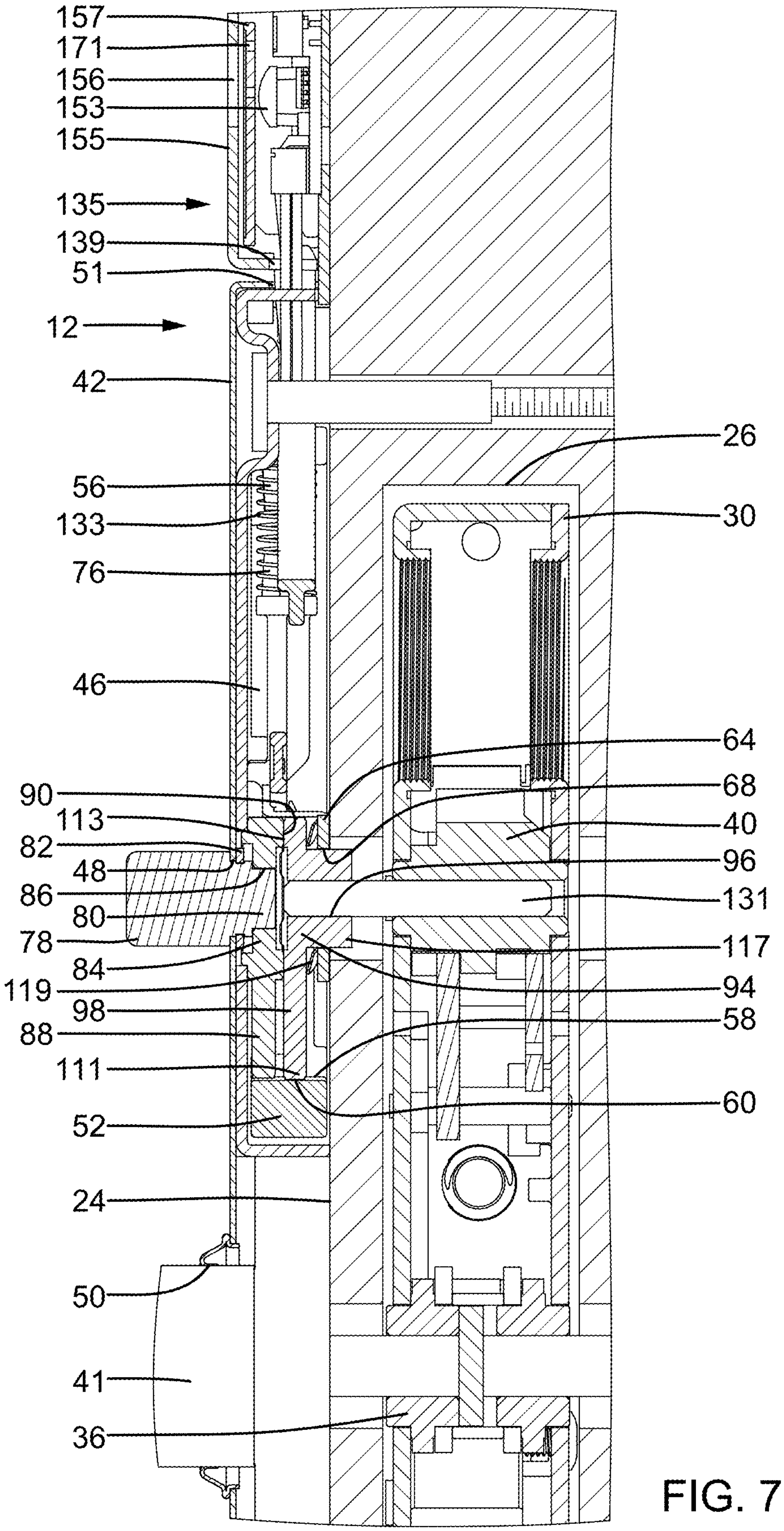
FIG. 7 is a cross sectional view taken along section line D-D of FIG. 6.

With reference to FIG. 7, when the interlocking member 52 moves to the descended position, the indicating part 171 of the indicating member 157 moves to a position aligned with the lighting unit 153 and the display area 156. Nevertheless, the outer connecting member 84 is in the retaining position, and the sensor 173 is not activated. Thus, the lighting unit 153 may emit light when the anti-theft latch 34 is in the anti-theft position.

With reference to FIGS. 6A and 8, with the anti-theft latch 34 in the anti-theft position, the outer connecting member 84 in the retaining position, and the inner connecting member 94 in the locking position, when the handle 41 is pivoted, the connecting member 36 actuates the latch 32 to move from the latching position to the unlatching position and also actuates the swayable member 38 to pivot, which, in turn, actuates the push member 40 and the interlocking pin 131 to pivot jointly in the clockwise direction. Thus, the anti-theft latch 34 moves from the anti-theft position to the non-anti-theft position, and the interlocking pin 131 actuates the inner connecting member 94 to pivot from the locking position to the non-locking position. At the same time, the inner differential face 113 of the inner connecting member 94 actuates the outer differential face 90, such that the outer connecting member 84 pivots from the retaining position to the non-alert position. Furthermore, the outer connecting member 84 returns the knob 78 to its initial position.

With reference to FIGS. 6A, 6B, 9, and 10, with the anti-theft latch 34 in the anti-theft position, the outer connecting member 84 in the retaining position, and the inner connecting member 94 in the locking position, when the knob 78 is further pivoted in the counterclockwise direction, the outer connecting member 84 pivots from the retaining position to an alert position (see FIG. 9), such that the outer swayable arm 88 activates the sensor 173. The lighting unit 153 emits light which passes through the indicating portion 173 and transmits the display area 156 of the outer cover 153, thereby providing a visual alert effect (such as flicking light) which can be seen by the naked eye.

It is noted that during movement (which may be a small angle, such as 10°) of the outer connecting member 84 from the retaining position to the alert position, the outer swayable arm 88 leaves away from the lower end face 58 of the interlocking member 52. Furthermore, the lower end face 58 is biased by the two springs 133 to displace a small travel (with the interlocking member 52 still located in the descended position) toward the inner swayable arm 98. The distal end 111 of the inner swayable arm 98 still engages with the groove 60, such that the interlocking member 52 is still biased to the descended position by the inner connecting member 94. Since the distal end 111 of the inner swayable arm 98 is still engaged with the groove 60, the outer differential face 90 cannot be used to pivot the inner connecting member 94 via the inner differential face 113. The outer differential face 90 of the outer connecting member 84 further squeezes the inner differential face 113, such that the inner connecting member 94 displaces in the axial direction of the handle pivotal connection portion 50 while compressing the spring plate 119. Therefore, the outer connecting member 84 pivots from the retaining position to the alert position while the inner connecting member 94 is retained in the locking position. As a result, the inner swayable arm 98 of the inner connecting member 94 can bias the interlocking member 52 to the descended position, such that the indicating part 171 of the indicating member 157 maintains in alignment with the lighting unit 153 the display area 156, assuring that the light emitted by the lighting unit 153 transmits through the outer cover 155 to the outer side, thereby providing an alert effect.

With reference to FIGS. 9 and 11, with the anti-theft latch 34 in the anti-theft position, the latch 32 in the latching position, the outer connecting member 84 in the alert position, and the inner connecting member 94 in the locking position (FIG. 9), when the handle 41 is pivoted, the latch 32 moves from the latching position to the unlatching position. The swayable member 38 pivots the push member 40, thereby moving the anti-theft latch 34 from the anti-theft position to the non-anti-theft position. The push member 40 actuates the interlocking pin 131 and the inner connecting member 94 to pivot from the locking position to the non-locking position. The inner differential face 113 actuates the outer differential face 90 to pivot the outer connecting member 84 from the alert position to the retaining position. Thus, the interlocking member 52 maintains in the descended position when the anti-theft latch 34 moves to the non-anti-theft position.

With the inner connecting member 94 in the non-locking position and with the outer connecting member 84 maintained in the retaining position, when the knob 78 is further pivoted in the clockwise direction in FIG. 11, the outer connecting member 84 can return to the non-alert position, such that the operating portion 12 can return to the state shown in FIG. 3.

The door lock operating device 10 according to the present invention may be but not limited to be used in, for example, a school campus. In an ordinary (non-emergent) condition, when the anti-theft latch 34 of the door lock 28 is moved to the anti-theft position through operation of the door lock operating device 10, the outer connecting member 84 maintains in the retaining position, such that the lighting unit 153 does not emit light. In a case that a gunshot event occurs in a place in the campus, after a door of a classroom in the campus is closed, the knob 78 is used to move the anti-theft latch 34 to the anti-theft position and the outer connecting member 84 is pivoted to the alert position, such that the door of the classroom cannot be easily opened from outside the classroom. The indicating part 171 of the indicating portion 135 is aligned with the lighting unit 153 and the display area 156, such that a person from the outer side of the door lock operating device 10 can observe that the anti-theft latch 34 is in the anti-theft position. Therefore, panicked students, teachers, and/or staff in the classroom are less likely to mistakenly operate the door lock operating device 10, thereby preventing movement of the anti-theft latch 34 to the non-anti-theft position.

The technical features and the operation of the present invention have been described in detail, it can be appreciated that the door lock operating device 10 according to the present invention includes at least the following advantages. The outer connecting member 84 and the inner connecting member 94 may pivot jointly. When the inner connecting member 94 is in the locking position, the outer connecting member 84 may be selectively in the alert position in which the lighting unit 153 emits light to provide an alert effect or not in the alert position in which the lighting unit 153 does not emit light. Thus, when the anti-theft latch 34 of the door lock operating device 10 is in the anti-theft position, the lighting unit 153 can be controlled to or not to emit light, thereby allowing use in an ordinary condition and an emergent condition requiring an alert effect.

The outer differential face 90 of the outer connecting member 84 and the inner differential face 113 of the inner connecting member 94 may abut against each other to permit joint movement, such that the inner connecting member 94 may move in the axial direction of the knob pivotal connection portion 48. Accordingly, one of the inner connecting member 94 and the outer connecting member 84 may pivot while the other doesn't. Furthermore, by the provision of the spring plate 119 which biases the inner differential face 113 of the inner connecting member 94 to abut against the outer differential face 90 of the outer connecting member 84, the inner connecting member 94 and the outer connecting member 84 may pivot jointly. This permits control of the lighting unit 153 to or not to emit light while the anti-theft latch 34 is in the anti-theft position.

The groove 60 of the interlocking member 52 may reliably retain the inner connecting member 94 in the locking position while the outer connecting member 84 is moving from the retaining position to the alert position, such that the lighting unit 153 may emit or not emit light while the anti-theft latch 34 is in the anti-theft position.

The lighting unit 153 may be selected to emit or not to emit light when the anti-theft latch 34 is in the anti-theft position. Thus, the indicating portion 135 is applicable in both an ordinary condition and an emergent condition (in which the anti-theft latch 34 is in the anti-theft position must be indicated). Therefore, mistaken operation by a person to move the anti-theft latch 34 to the non-anti-theft position can be avoided in an emergent condition.

Now that the basic teachings of the present invention have been explained, many extensions and variations will be obvious to one having ordinary skill in the art. For example, the interlocking member 52 may include only one upper engaging end 56, the supporting member 70 may include only one supporting end 76, and only one spring 133 is provided. In this case, the upper engaging end 56 may be located in a central portion of the interlocking member 52, and the supporting end 76 may be located in a central portion of the supporting member 70, such that only one spring 133 is sufficient to stably bias the interlocking member 52 to the descended position. Alternatively, the indicating portion 135 does not have to include the lighting unit 153. In this case, when the interlocking member 52 is in the descended position, the indicating part 171 of the indicating member 157 is aligned with the display area 156 of the outer cover 155, such that an observer can immediately see the indicating part 17 from the outer side of the door lock operating device 10 and, thus, identify that the door lock 28 is locked.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A door lock operating device comprising:

a main frame;

a knob pivotably mounted to the main frame;

an inner connecting member pivotably received in the main frame and configured to couple with a push member of a door lock to pivot therewith, wherein the door lock includes an anti-theft latch movable between an anti-theft position and a non-anti-theft position, wherein when the anti-theft latch is in the non-anti-theft position, the inner connecting member is in a non-locking position, and wherein when the anti-theft latch is in the anti-theft position, the inner connecting member is in a locking position;

an outer connecting member coupled with the knob to pivot therewith and received in the main frame, wherein the outer connecting member and the inner connecting member are jointly pivotable, wherein the outer connecting member is pivotable by the knob to an alert position, a non-alert position, and a retaining position, wherein the retaining position is located between the alert position and the non-alert position in a circumferential direction about a pivotal axis of the outer connecting member, wherein when the outer connecting member is in the retaining position, the inner connecting member is located in one of the locking position and the non-locking position, wherein when the outer connecting member is pivoted by the knob to move from the non-alert position to the retaining position, the outer connecting member actuates the inner connecting member to move from the non-locking position to the locking position, and wherein when the outer connecting member is pivoted from the retaining position to the non-alert position, the outer connecting member actuates the inner connecting member to pivot from the locking position to the non-locking position;

a handle pivotably mounted to the main frame and configured to couple with a connecting member of the door lock to pivot therewith, wherein the connecting member is operatively connected to a latch of the door lock, wherein pivotal movement of the handle causes movement of the latch from a latching position to an unlatching position, wherein movement of the latch from the latching position to the unlatching position causes movement of the anti-theft latch from the anti-theft position to the non-anti-theft position, such that the inner connecting member pivots from the locking position to the non-locking position, and the outer connecting member pivots from the alert position to the retaining position or pivots from the retaining position to the non-alert position;

a sensor securely mounted in the main frame, wherein the sensor is activated only when the outer connecting member is in the alert position; and an indicating portion including a lighting unit and an indicating member which is movable, wherein the indicating member includes an indicating part through which light is transmits, the indicating member is interlocked with the inner connecting member and the outer connecting member, wherein interlocking between the indicating part and the outer connecting member arm is independent from interlocking between the inner connecting member and the indicating part, wherein the lighting unit is electrically connected to the sensor and emits light only when the sensor is activated, wherein when the inner connecting member is in the non-locking position and the outer connecting member is in the non-alert position, the indicating part of the indicating member is misaligned from the lighting unit, wherein when the inner connecting member is in the locking position and the outer connecting member is in the retaining position, the indicating part is aligned with the lighting unit and the lighting unit does not emit light, wherein when the inner connecting member is in the locking position and the outer connecting member is in the alert position, the indicating part is aligned with the lighting unit and the lighting unit emits light transmitting through the indicating part, wherein when the outer connecting member is in the retaining position and the inner connecting member is in the non-locking position, the indicating part is aligned with the lighting unit and the lighting unit does not emit light, with the door lock operating device further comprising a limiting member and a spring plate, wherein the limiting member is securely mounted in the main frame and includes a pivotal portion, wherein the inner connecting member is pivotably connected to the pivotal portion and is movable in an axial direction of the pivotal portion, wherein the outer connecting member includes an outer differential face, wherein the inner connecting member includes an inner differential face, wherein the spring plate is mounted between the inner connecting member and the limiting member, wherein the spring plate biases the inner differential face of the inner connecting member to slidably engage with the outer differential face of the outer connecting member, wherein when the inner connecting member is in the locking position and the outer connecting member pivots to the alert position, the outer differential face slides relative to the inner differential face, such that the inner connecting member displaces in the axial direction of the pivotal portion, and the inner connecting member maintains in the locking position while the outer connecting member is pivoting to the alert position.

2. A door lock operating device comprising:

a main frame;

a knob pivotably mounted to the main frame;

an inner connecting member pivotably received in the main frame and configured to couple with a push member of a door lock to pivot therewith, wherein the door lock includes an anti-theft latch movable between an anti-theft position and a non-anti-theft position, wherein when the anti-theft latch is in the non-anti-theft position, the inner connecting member is in a non-locking position, and wherein when the anti-theft latch is in the anti-theft position, the inner connecting member is in a locking position;

an outer connecting member coupled with the knob to pivot therewith and received in the main frame, wherein the outer connecting member and the inner connecting member are jointly pivotable, wherein the outer connecting member is pivotable by the knob to an alert position, a non-alert position, and a retaining position, wherein the retaining position is located between the alert position and the non-alert position in a circumferential direction about a pivotal axis of the outer connecting member, wherein when the outer connecting member is in the retaining position, the inner connecting member is located in one of the locking position and the non-locking position, wherein when the outer connecting member is pivoted by the knob to move from the non-alert position to the retaining position, the outer connecting member actuates the inner connecting member to move from the non-locking position to the locking position, and wherein when the outer connecting member is pivoted from the retaining position to the non-alert position, the outer connecting member actuates the inner connecting member to pivot from the locking position to the non-locking position;

a handle pivotably mounted to the main frame and configured to couple with a connecting member of the door lock to pivot therewith, wherein the connecting member is operatively connected to a latch of the door lock, wherein pivotal movement of the handle causes movement of the latch from a latching position to an unlatching position, wherein movement of the latch from the latching position to the unlatching position causes movement of the anti-theft latch from the anti-theft position to the non-anti-theft position, such that the inner connecting member pivots from the locking position to the non-locking position, and the outer connecting member pivots from the alert position to the retaining position or pivots from the retaining position to the non-alert position;

a sensor securely mounted in the main frame, wherein the sensor is activated only when the outer connecting member is in the alert position; and an indicating portion including a lighting unit and an indicating member which is movable, wherein the indicating member includes an indicating part through which light is transmits, the indicating member is interlocked with the inner connecting member and the outer connecting member, wherein interlocking between the indicating part and the outer connecting member arm is independent from interlocking between the inner connecting member and the indicating part, wherein the lighting unit is electrically connected to the sensor and emits light only when the sensor is activated, wherein when the inner connecting member is in the non-locking position and the outer connecting member is in the non-alert position, the indicating part of the indicating member is misaligned from the lighting unit, wherein when the inner connecting member is in the locking position and the outer connecting member is in the retaining position, the indicating part is aligned with the lighting unit and the lighting unit does not emit light, wherein when the inner connecting member is in the locking position and the outer connecting member is in the alert position, the indicating part is aligned with the lighting unit and the lighting unit emits light transmitting through the indicating part, wherein when the outer connecting member is in the retaining position and the inner connecting member is in the non-locking position, the indicating part is aligned with the lighting unit and the lighting unit does not emit light, with the door lock operating device further comprising an interlocking member slidably received in the main frame, wherein the interlocking member has a lower end face, wherein the indicating member is coupled with the interlocking member to move therewith, wherein the inner connecting member further includes an inner swayable arm, wherein the outer connecting member includes an outer swayable arm, wherein when the inner connecting member is in the non-locking position and the outer connecting member is in the non-alert position, the interlocking member is biased to an ascended position, such that the indicating part is spaced from the lighting unit, wherein when the outer connecting member pivots from the non-alert position to the retaining position, the outer swayable arm actuates the interlocking member to move from the ascended position to a descended position, wherein when the inner connecting member is in the locking position and the outer connecting member is in the retaining position, the outer swayable arm presses against the lower end face of the interlocking member to bias the interlocking member to the ascended position, wherein when the inner connecting member is in the locking position and the outer connecting member is in the alert position, the inner swayable arm presses against the lower end face of the interlocking member to bias the interlocking member to the ascended position, wherein when the interlocking member is in the descended position and the outer connecting member is in the alert position, the indicating part is aligned with the lighting unit which emits light passing through the indicating par to provide an alert effect.

3. The door lock operating device as claimed in claim 2, wherein the inner swayable arm includes a distal end, wherein the lower end face of the interlocking member includes a groove, wherein when the inner connecting member is in the locking position and the outer connecting member is in the retaining position, the distal end of the inner swayable arm disengages from the groove, wherein when the inner connecting member is in the locking position and the outer connecting member pivots toward the alert position, the distal end of the inner swayable arm engages with the groove to maintain the inner connecting member in the locking position while the outer connecting member pivots from the retaining position to the alert position.

4. A door lock operating device comprising:

a main frame;

a knob pivotably mounted to the main frame;

an outer connecting member coupled with the knob to pivot therewith and received in the main frame, wherein the outer connecting member is pivotable by the knob to an alert position;

an inner connecting member pivotably received in the main frame and coupled with the outer connecting member to pivot therewith, wherein pivotal movement of the knob interlocks the outer connecting member to actuate the inner connecting member to pivot to between a locking position and a non-locking position, wherein when the outer connecting member is in the alert position, the inner connecting member maintains in the locking position, wherein when the inner connecting member is in the locking position, the outer connecting member is selectively pivoted to the alert position, wherein the inner connecting member is configured to couple with an anti-theft latch, wherein when the inner connecting member pivots from the non-locking position to the locking position, the anti-theft latch moves from a non-anti-theft position to an anti-theft position, and wherein when the inner connecting member pivots from the locking position to the non-locking position, the anti-theft latch moves from the anti-theft position to the non-anti-theft position; and an indicating portion disposed an on outer side of the main frame and interlocked with the inner connecting member and the outer connecting member, wherein interlocking between the indicating portion and the outer connecting member is independent from interlocking between the inner connecting member and the indicating portion, wherein the indicating portion indicates the anti-theft latch is in the anti-theft position only when the outer connecting member is in the alert position, with the door lock operating device further comprising a limiting member and a spring plate, wherein the limiting member is securely mounted in the main frame, wherein the limiting member includes a pivotal portion pivotably connected to the inner connecting member, wherein the outer connecting member includes an outer differential face, wherein the inner connecting member includes an inner differential face, wherein the spring plate is mounted between the inner connecting member and the limiting member, wherein the spring plate biases the inner differential face of the inner connecting member to slidably engage with the outer differential face of the outer connecting member, wherein when the inner connecting member is in the locking position and the outer connecting member pivots to the alert position, the outer differential face slides relative to the inner differential face, such that the inner connecting member displaces in the axial direction of the pivotal portion, and the inner connecting member maintains in the locking position while the outer connecting member is pivoting to the alert position.

5. The door lock operating device as claimed in claim 4, further comprising a sensor, wherein the indicating portion includes a lighting unit electrically connected to the sensor, and wherein the sensor is activated to cause the lighting unit to emit light for indicating the anti-theft latch is in the anti-theft position only when the outer connecting member is in the alert position.

6. The door lock operating device as claimed in claim 5, wherein the indicating portion further includes an outer cover and an indicating member which is movably received in the outer cover, wherein the indicating member includes an indicating part, wherein the outer cover includes a display area through which light transmits, wherein the indicating member is interlocked with the inner connecting member and the outer connecting member, wherein interlocking between the indicating member and the outer connecting member is independent from interlocking between the inner connecting member and the indicating member, wherein the outer connecting member is further pivotable to a retaining position and a non-alert position, wherein when the inner connecting member is in the non-locking position and the outer connecting member is not in the retaining position, the indicating member maintains in a position in which the indicating part is misaligned from the lighting unit and the display area, and wherein when the inner connecting member is in the non-locking position or the outer connecting member is in the retaining position, the indicating part is aligned with the lighting unit and the display area.

7. The door lock operating device as claimed in claim 5, wherein the outer connecting member further includes an outer swayable arm and is further pivotable by the knob to a non-alert position, wherein when the outer connecting member is in the non-alert position, the inner connecting member maintains in the non-locking position, wherein when the outer connecting member is in the alert position, and the outer swayable arm activates the sensor to cause the lighting unit to emit light.

8. The door lock operating device as claimed in claim 4, further comprising an interlocking member slidably received in the main frame, wherein the interlocking member has a lower end face, wherein the inner connecting member further includes an inner swayable arm, wherein the outer connecting member includes an outer swayable arm, wherein the indicating portion further includes an indicating member coupled with the interlocking member to move therewith, wherein the indicating member includes an indicating part through which light transmits, wherein the outer connecting member is further pivotable by the knob to a non-alert position and a retaining position located between the alert position and the non-alert position in a circumferential direction about a pivotal axis of the outer connecting member, wherein when the inner connecting member is in the locking position, the outer connecting member is in one of the retaining position and the alert position, wherein when the outer connecting member is in the retaining position, the inner connecting member is in one of the locking position and the non-locking position, wherein when the inner connecting member is in the non-locking position and the outer connecting member is in the non-alert position, the interlocking member is biased to an ascended position, such that the indicating part is spaced from the lighting unit, wherein when the outer connecting member pivots from the non-alert position to the retaining position, the outer swayable arm actuates the interlocking member to move from the ascended position to a descended position, wherein when the inner connecting member is in the locking position and the outer connecting member is in the retaining position, the outer swayable arm presses against the lower end face of the interlocking member to bias the interlocking member to the descended position, wherein when the inner connecting member is in the locking position and the outer connecting member is in the alert position, the inner swayable arm presses against the lower end face of the interlocking member to bias the interlocking member to the descended position, wherein when the interlocking member is in the descended position and the outer connecting member is in the alert position, the indicating part is aligned with the lighting unit which emits light passing through the indicating par to provide an alert effect.

9. The door lock operating device as claimed in claim 8, wherein the indicating portion further includes an outer cover, wherein the outer cover includes a display area aligned with the lighting unit and through which light transmits, wherein the indicating member is located on an inner side of the outer cover, wherein when the interlocking member is in the ascended position, the indicating part is misaligned from the display area and the lighting unit, and wherein when the interlocking member is in the descended position, the indicating part is aligned with the lighting unit and the display area.

10. The door lock operating device as claimed in claim 8, wherein the inner swayable arm includes a distal end, wherein the lower end face of the interlocking member includes a groove, wherein when the inner connecting member is in the locking position and the outer connecting member is in the retaining position, the distal end of the inner swayable arm disengages from the groove, wherein when the inner connecting member is in the locking position and the outer connecting member pivots toward the alert position, the distal end of the inner swayable arm engages with the groove to maintain the inner connecting member in the locking position while the outer connecting member pivots from the retaining position to the alert position.

11. The door lock operating device as claimed in claim 8, further comprising a supporting member and a spring, wherein the supporting member is securely mounted in the main frame, wherein the supporting member includes a supporting end, wherein the interlocking member further includes an upper engaging end spaced from the lower end face, wherein the supporting end is located between the upper engaging end and the lower end face, wherein the spring is coupled with the upper engaging end and the supporting end, and wherein the spring biases the interlocking member to the ascended position.

12. The door lock operating device as claimed in claim 4, further comprising a handle pivotably connected to the main frame and configured to be coupled with a connecting member of a door lock to pivot therewith, wherein the connecting member is interlocked with a latch of the door lock, wherein the latch is interlocked with the anti-theft latch, wherein when the outer connecting member is in either of the alert position and the retaining position, pivotal movement of the handle causes movement of the latch from a latching position to an unlatching position, which, in turn, causes movement of the anti-theft latch from the anti-theft position to the non-anti-theft position, thereby pivoting the inner connecting member from the locking position to the non-locking position, and the outer connecting member in the alert position leaves the alert position, or the outer connecting member in the retaining position pivots from the retaining position to the non-alert position.

* * * * *